US010878445B2

(12) United States Patent
Sato et al.

(10) Patent No.: US 10,878,445 B2
(45) Date of Patent: Dec. 29, 2020

(54) ADVERTISEMENT MANAGEMENT SYSTEM AND ADVERTISEMENT MANAGEMENT DEVICE

(71) Applicants: SOCIAL GEAR PTE LTD, Singapore (SG); Shunsuke Sato, Singapore (SG)

(72) Inventors: Shunsuke Sato, Singapore (SG); Kei Yamane, Singapore (SG)

(73) Assignees: SOCIAL GEAR PTE LTD, Singapore (SG); Shunsuke Sato, Singapore (SG)

( * ) Notice: Subject to any disclaimer, the term of this patent is extended or adjusted under 35 U.S.C. 154(b) by 340 days.

(21) Appl. No.: 15/737,719

(22) PCT Filed: May 27, 2016

(86) PCT No.: PCT/JP2016/065788
§ 371 (c)(1),
(2) Date: Dec. 18, 2017

(87) PCT Pub. No.: WO2017/029855
PCT Pub. Date: Feb. 23, 2017

(65) Prior Publication Data
US 2018/0181984 A1 Jun. 28, 2018

(30) Foreign Application Priority Data
Aug. 17, 2015 (JP) .................... 2015-160336

(51) Int. Cl.
*G06Q 30/02* (2012.01)
*G06Q 30/08* (2012.01)
(52) U.S. Cl.
CPC ......... *G06Q 30/0243* (2013.01); *G06Q 30/02* (2013.01); *G06Q 30/0275* (2013.01); *G06Q 30/08* (2013.01)

(58) Field of Classification Search
CPC .... G06Q 30/02; G06Q 30/0243; G06Q 30/08; G06Q 30/0275
(Continued)

(56) References Cited

U.S. PATENT DOCUMENTS

2007/0027760 A1* 2/2007 Collins ................ G06Q 30/02
705/14.54
2008/0270164 A1 10/2008 Kidder et al.
(Continued)

FOREIGN PATENT DOCUMENTS

JP 2014-533405 A 12/2014

OTHER PUBLICATIONS

International Search Report issued in PCT/JP2016/065788; dated Aug. 23, 2016.
(Continued)

*Primary Examiner* — Sun M Li
(74) *Attorney, Agent, or Firm* — Studebaker & Brackett PC

(57) ABSTRACT

In an advertisement management system, an advertising server allows an advertiser of an internet advertisement to set one or more campaigns and one or more advertisement sets for each campaign and collects a plurality of performance information of each advertisement set. In an advertisement management device connected with the advertising server, a campaign management screen providing section makes a management terminal display a campaign management screen selectable a target campaign, an advertisement set management screen providing section displays one or more advertisement sets of the target campaign by a parallel coordinate graph and makes the management terminal display an advertisement set management screen selectable one or more target advertisement sets, and an advertisement set adjustment screen providing section makes the management
(Continued)

terminal display an advertisement set adjustment screen adjustable operation information of one or more target advertisement sets.

14 Claims, 13 Drawing Sheets

(58) Field of Classification Search
USPC .......................................... 705/14.42, 14.73
See application file for complete search history.

(56) References Cited

U.S. PATENT DOCUMENTS

2010/0262484 A1    10/2010  Bardin et al.
2013/0006957 A1*   1/2013   Huang .................... G06F 3/017
                                                        707/706
2013/0124297 A1    5/2013   Hegeman et al.

OTHER PUBLICATIONS

The extended European search report issued by the European Patent Office dated Mar. 26, 2019, which corresponds to European Patent Application No. 16836847.0-1217 and is related to U.S. Appl. No. 15/737,719.

* cited by examiner

FIG. 11

Set display item (Change displayed axis)

Main values    14/40 All

Budget・period
- ☑ Budget
- ☑ Spent price
- ☐ Spent rate (%)
- ☐ Budget balance
- ☐ Estimated budget per day
- ☐ Today spent price
- ☑ Today spent rate (%)
- ☐ Today balance
- ☐ Spending pace
- ☐ Progressed days
- ☐ Progressed days rate (%)
- ☐ Remaining days Display
- ☑ Impression
- ☐ CPM
- ☐ Reach
- ☐ CPP (uCPM)
- ☐ Social impression
- ☐ Social CPM
- ☐ Social reach
- ☐ Social CPP
- ☑ Frequency Click
- ☑ CTR
- ☐ CTR (unique)
- ☑ Clicks
- ☑ CPC
- ☐ Clicking users
- ☐ Unique click (cost)
- ☐ Social click
- ☐ Social clicking users Action
- ☑ Actions
- ☑ CPA
- ☐ Action users
- ☐ Action users (cost)
- ☐ Actions/Imp.
- ☐ Action value Objective conversion (CV)
- ☑ Objective conversions
- ☑ Objective conversion cost
- ☑ CVs/Imp
- ☑ Objective CVR
- ☐ Objective CV value

| Page engagement/Reach to neighboring area | 0/21 All |
| Post engagement | 0/33 All |
| Website conversion | 2/27 All |
| Mobile application | 0/51 All |
| PC application | 0/18 All |
| Movie viewing | 0/51 All |
| Commercial event | 0/15 All |
| Others | 0/12 All |

[ Close ] [ Update ]

//ADVERTISEMENT MANAGEMENT SYSTEM AND ADVERTISEMENT MANAGEMENT DEVICE

TECHNICAL FIELD

The present invention relates to an advertisement management system and an advertisement management device facilitating review and adjustment of operation information and performance information of internet advertisements.

BACKGROUND ART

An advertisement distribution system publishes an internet advertisement for advertising products, services and others to internet websites or the like. The internet advertisement is displayed on an advertisement frame in various websites, for example, a search engine site, an electronic commerce (EC) site, a social networking service (SNS) site and others. The advertisement distribution system may include an advertising server for distributing the internet advertisement (hereinafter, often called as an advertisement simply) independent of a web server for providing the website, for instance.

For example, an SNS system for hosting the SNS includes an SNS hosting device (an SNS server) to allow post of an article and a picture from a terminal (a user terminal) of a user having an account. Moreover, such a SNS system includes the SNS server and the advertising server, and thereby, the advertisement distribution system is configured so as to display the advertisement of an advertiser on a display area, such as a timeline, in the user terminal.

The advertisement distribution system may apply advertising structure useful for setting many advertising campaigns to an account of the advertiser and useful for setting different advertising objectives to each advertising campaign. This advertising structure allows to set many advertisement sets with regard to each advertising campaign and to set operation information of different advertisements with regard to each advertisement set. Further, it allows to set many published advertisements with regard to each advertisement set and to set different articles, pictures and their arrangement of different advertisements with regard to the respective published advertisements.

In the advertisement distribution system, performance of the published advertisement is varied depending on which of operation information is set to the advertisement published on the website. Accordingly, the performance information, such as the number of actions of browsing and clicking and cost effectiveness of the performed action with regard to a budget for the advertisement, may be collected for each advertisement set, and then, presented to the advertiser. Incidentally, in order to allow detail analysis of the performance of the advertisement, the presentation of much performance information is required in the advertisement distribution system. The advertiser may review the operation information and the performance information with regard to various advertisement sets and adjust the published advertisement and the operation information of each advertisement set in accordance with the reviewed result.

As an example, Patent Document 1 discloses a technique of multi-dimensional advertisement bidding. According to this technique, an online advertising system receives advertisements from an advertiser. The advertiser may provide a budget, a time period, a constraint, an impression goal and a performance weighting associated with the advertisement. When the advertisement is requested to the advertising system from a client, a bid for each advertisement may be determined on the basis of the budget associated with the advertisement and/or the impression goal associated with the advertisement. Advertisement performance associated with the advertisement request may be predicted, and the bid for each advertisement may be determined on the basis of the performance weighting and the predicted performance associated with the advertisement request. The bid for the advertisement may be weighted by the pace of budget consumption by the advertisement, or by the pace of the advertisement progressing towards the advertisement's impression goal. The advertisement displayed to the client is selected from among the one or more advertisements on the basis of the determined bids for the advertisements.

PRIOR ART DOCUMENT

Patent Document

[PATENT DOCUMENT 1] Japanese unexamined patent application publication No. 2014-533405

SUMMARY OF INVENTION

Problems to be Solved by the Invention

As mentioned above, in the advertisement distribution system, many advertisement sets may be set to each campaign set to the account of the advertiser. Moreover, much operation information may be set to the respective advertisement sets and much performance information for each advertisement set may be presented to the advertiser. However, a conventional advertisement distribution system only presents the operation information and the performance information of each advertisement set to the advertiser by a report composed of mere numerical values, a table and others. Therefore, for the advertiser, it is difficult to compare and to review much operation information and performance information of many advertisement sets, a load of advertisement management work increases, and it is feared that misreading of data or the like occurs. Moreover, even if the advertiser reviews the operation information and the performance information of each advertisement set by using the report composed of mere numerical values, a table and others, the operation information or the like of the advertisement set associated with their information cannot be immediately adjusted, and accordingly, the advertisement management work is difficult. Further, in the conventional advertisement distribution system, the advertiser must adjust much operation information one by one while referring and considering the operation information and the performance information about many advertisement sets one by one. Therefore, time and labor are taken in order that, with regard to a plurality of advertisement sets and plurality of operation information, numerical values are adjusted by the same setting or the same rate while referring and considering the operation information and the performance information.

An objective of the present invention is, under consideration of the above-mentioned circumstances, to reduce a load of management work of an internet advertisement and a load of adjustment of its operation information, and to improve use of the internet advertisement.

Means for Solving the Problem

In order to solve the above-mentioned problems, an advertisement management system of the present invention comprises an advertising server and an advertisement management device. The advertising server allocates an advertising account to an advertiser of an advertisement published by using an internet. The advertising server is configured to be used for setting one or more campaigns for indicating an advertising objective with regard to the advertiser, to be used for setting one or more advertisement sets for indicating combination of operation information of advertising with regard to each of the one or more campaigns, to be used for setting one or more published advertisement with regard to each of the one or more advertisement sets. Further, the advertising server collects a plurality of performance information for indicating performance of each advertisement set with regard to each of the one or more advertisement sets. The advertisement management device is connected to the advertising server to be used for reviewing and adjusting the campaign, the advertisement set and the published advertisement. The advertisement management device includes a campaign management screen providing section, an advertisement set management screen providing section and an advertisement set adjustment screen providing section. The campaign management screen providing section for makes a terminal of the advertiser display a campaign management screen used for selecting a target campaign among the one or more campaigns. The advertisement set management screen providing section displays the one or more advertisement sets contained in the target campaign selected in the campaign management screen by a parallel coordinate graph having a basis axis of the plurality of performance information, and makes the terminal of the advertiser display an advertisement set management screen used for selecting one or more target advertisement sets among the one or more advertisement sets. The advertisement set adjustment screen providing section makes the terminal of the advertiser display an advertisement set adjustment screen used for adjusting the operation information contained in the one or more target advertisement sets selected in the advertisement set management screen.

In accordance with the advertisement management system of the present invention, the advertisement set management screen for displaying much operation information and much performance information of many advertisement sets by the parallel coordinate graph is provided to the terminal of the advertiser and a manager. Therefore, the advertiser and the manager can easily compare and review much operation information and much performance information of many advertisement sets. Thereby, a load of management work of the advertisement by the advertiser and the manager can be reduced and it is possible to prevent misreading of data or the like. Further, it is possible to review at a glance and immediately detect, among the operation information of the advertisement set, one or more (a plurality of) information requiring adjustment. Moreover, it is possible, by selection operation of the advertisement set required adjustment of the operation information, to bring the advertisement set adjustment screen used for collectively adjusting the operation information of the one or more (a plurality of) advertisement sets. Therefore, a procedure to adjustment of the operation information of the advertisement set can be simplified and the management work of the advertisement can be optimized.

Moreover, the advertisement set management screen providing section is configured to be capable of directing a scope by slide operation along the basis axis on the parallel coordinate graph and to be capable of determining a narrowed-down scope on the basis of the directed scope. In addition, the advertisement set management screen providing section, on the parallel coordinate graph, displays the advertisement set within the narrowed-down scope more remarkable than the advertisement set out of the narrowed-down scope and allows selection of only the advertisement set within the narrowed-down scope as the target advertisement set.

Thereby, the advertiser and the manager can easily determine the narrowed-down scope by using the parallel coordinate graph and can easily detect the advertisement set requiring adjustment of the operation information. Therefore, since the advertisement set adjustment screen used for collectively adjusting the operation information of the one or more (a plurality of) advertisement sets, with regard to the advertisement set requiring adjustment of the operation information, is immediately brought to the advertiser and the manager, the management work of the advertisement can be optimized.

Moreover, the advertising server is used for setting a bidding price as the operation information. The advertisement set adjustment screen providing section displays the bidding price of each of the one or more target advertisement sets selected in the advertisement set management screen by a bidding price slide bar capable of slide-adjusting it. In addition, the advertisement set adjustment screen providing section displays an average bidding price of the one or more target advertisement sets by an average bidding price slide bar capable of slide-adjusting it collectively.

Thereby, the advertiser and the manager can easily correct the bidding price on the basis of the performance information while comparing and reviewing the plurality of advertisement sets. At this time, the advertiser and the manager can adjust the bidding price about the advertisement sets one by one, or about a collective object of the plurality of advertisement sets, or alternatively, a collective object of some selected advertisement sets requiring adjustment.

Moreover, the advertisement set adjustment screen providing section is configured to display, on the advertisement set adjustment screen, a collective adjustment manner selection list for listing a plurality of kinds of collective adjustment manners for collectively adjusting the respective bidding prices of the one or more target advertisement sets selected in the advertisement set management screen. In addition, the advertisement set adjustment screen providing section is configured to be capable of collectively adjusting the one or more target advertisement sets on the basis of the collective adjustment manner selected in the collective adjustment manner selection list.

Thereby, it is possible to collectively adjust the bidding prices of the plurality of target advertisement sets by a desired collective adjustment manner, and then, to reduce time and labor of the advertiser and the manager.

Alternatively, the advertising server is used for setting a budget as the operation information. The advertisement set adjustment screen providing section displays the budget of each of the one or more target advertisement sets selected in the advertisement set management screen by a budget slide bar capable of slide-adjusting it. In addition, the advertisement set adjustment screen providing section displays budgets of the one or more target advertisement sets by a total budget slide bar capable of slide-adjusting their collectively.

Thereby, the advertiser and the manager can easily correct the budget on the basis of the performance information while comparing and reviewing the plurality of advertisement sets. At this time, the advertiser and the manager can adjust the budget about the advertisement sets one by one, or about a collective object of the plurality of advertisement sets, or alternatively, a collective object of some selected advertisement sets requiring adjustment.

Moreover, the advertisement set adjustment screen providing section is configured to display, on the advertisement set adjustment screen, a collective adjustment manner selection list for listing a plurality of kinds of collective adjustment manners for collectively adjusting the respective budgets of the one or more target advertisement sets selected in the advertisement set management screen. In addition, the advertisement set adjustment screen providing section is configured to be capable of collectively adjusting the one or more target advertisement sets on the basis of the collective adjustment manner selected in the collective adjustment manner selection list.

Thereby, it is possible to collectively adjust the budgets of the plurality of target advertisement sets by a desired collective adjustment manner, for instance, to automatically distribute the budget according to the set bidding price or an actual cost, and then, to reduce time and labor of the advertiser and the manager.

Moreover, the advertisement set adjustment screen providing section displays the total budget slide bar adjustable within a range of the budget of the whole target campaign.

Thereby, it is possible to adjust increase or decrease of the whole budget of the advertisement set without necessity to input numerical values and to execute calculation, within the campaign budget range which can be visually and sensuously set, whole reviewing a total amount. Thereby, since the budget of the advertisement set is changed following movement of the slide without inputting and reviewing numerical values one by one, it is possible to rapidly carry out adjustment of simple increase or decrease of the budget.

In order to solve the above-mentioned problems, an advertisement management device of the present invention has the similar configuration and effect to the advertisement management device arranged in the above-described advertisement management system.

Effects of the Invention

In accordance with the present invention, it is possible to reduce a load of management work of an internet advertisement and a load of adjustment of its operation information, and to improve use of the internet advertisement.

BRIEF DESCRIPTION OF THE DRAWINGS

FIG. 11 It is a schematic diagram showing an example of a display item setting screen displayed by the advertisement set management screen providing section of the advertisement management device in the advertisement management system in accordance with the embodiment of the present invention.

EMBODIMENTS FOR CARRYING OUT THE INVENTION

First, with reference to FIG. 1, the entire structure of an advertisement management system 1 according to an embodiment of the present invention will be described. The advertisement management system 1 is a system for reviewing and adjusting operation information and performance information with regard to an internet advertisement published on an internet website or the like and advertising products, services and others.

The internet advertisement is often called as a net advertisement, an online advertisement and others, and is called as an advertisement simply, hereinafter. The advertisement is displayed on an advertisement frame in the various websites, for example, an enterprise site, a search engine site, an electronic commerce (EC) site, a content distribution site for a movie, music and others, a social networking service (SNS) site and others. The advertisement is classified by various distribution manners regardless of kinds of the websites, for example, classified under a demographic targeting advertisement with restricting a distribution target by attribute information, such as gender and age, a behavior targeting advertisement for displaying the advertisement having high relevance with conditions of past browsing pages of the user, a search linkage type advertisement linking with searched keywords, a content linkage type advertisement linking with substances of the content, a position linkage type advertisement linking with a current position of a mobile phone, and others.

Although the embodiment will be described about the advertisement management system 1 for managing the operation information and the performance information of the advertisement published on the SNS site as the website, the website publishing the advertisement managed by the advertisement management system 1 is not restricted by the SNS site.

Figure 1:
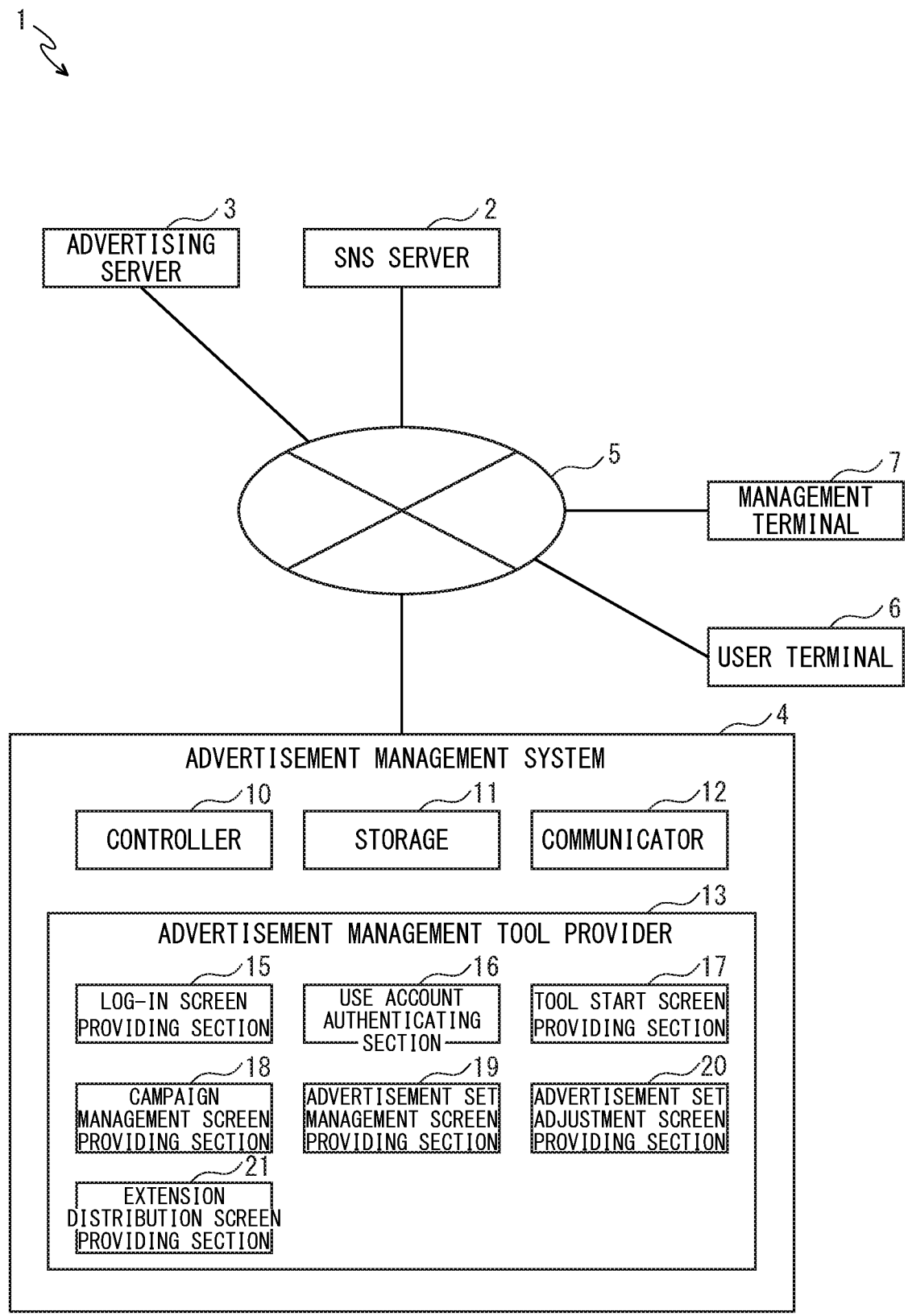
FIG. 1 It is a block diagram schematically showing an advertisement management system in accordance with an embodiment of the present invention.

As shown in FIG. 1, in the advertisement management system 1, an SNS server 2 as a web server, an advertising server 3 and an advertisement management device 4 are arranged on a network 5, such as an internet. For instance, the advertisement management system 1 is configured so that the SNS server 2 utilizes SSP (Supply-Side Platform) and the advertising server 3 utilizes DSP (Demand-Side Platform), thereby actualizing real time bidding (RTB) of the advertisement. Incidentally, for instance, the SNS server 2 is configured so as to collect and manage, by utilizing DMP (Data Management Platform), personal data of user or the like applied in an SNS service.

Moreover, in the advertisement management system 1, a user terminal 6 of a user having an account (an SNS account) in the SNS server 2 (hereinafter, called as an SNS user) and a management terminal 7 operated by an advertiser having an account (an advertising account) in the advertising server 3 or a manager granted a permission of advertisement management by the advertiser are connected to the network 5. Incidentally, in the advertisement management system 1, a plurality of user terminals 6 and a plurality of management terminals 7 may be arranged, but FIG. 1 illustrates one user terminal 6 and one management terminal 7, for convenience of description.

Next, the SNS server 2 will be described. The SNS server 2 is a server run by a business operator for hosting the SNS. One business operator may run a plurality of SNS servers 2, but FIG. 1 illustrates one SNS server 2, for convenience of description.

The SNS server 2 allocates the SNS account to each user, to which the SNS is hosted, and preserves it. The SNS server 2 is configured to manage the individual SNS sites to the SNS users having the SNS accounts, and to be used for hosting their to the respective user terminals 6 of the SNS users. The SNS server 2 receives post from the user terminal 6 of the SNS user having the SNS account, and reflects it in the SNS site of the SNS user, for example, has the received post display on a timeline. The SNS user can post when logging in the SNS server 2 by using the allocated SNS account.

Moreover, the SNS server 2 is configured to operate with cooperating with the advertising server 3 and shares individual user information of the SNS users having the SNS accounts with the advertising server 3. Subsequently, the SNS server 2, when receiving display instruction of the advertisement targeting a predetermined SNS user from the advertising server 3, publishes the advertisement on the SNS site of the targeted SNS user and hosts it to the user terminal 6. Further, the SNS server 2 receives an action about the advertisement published on the SNS site from the user terminal 6 and transmits it to the advertising server 3.

Next, the advertising server 3 will be described. The advertising server 3 is a server for operating with cooperating with the SNS server 2, and may be a server run by the same business operator as the SNS server 2, or alternatively, may be a server run by another business operator. One business operator may run a plurality of advertising servers 3, but FIG. 1 illustrates one advertising server 3, for convenience of description.

The advertising server 3 allocates the advertising account to each advertiser desiring publication of the advertisement on the SNS hosted by the SNS server 2 and preserves it. The advertiser may be the same one as the SNS user and the advertising account may be the same one as the SNS account. Alternatively, the advertiser may be other one than the SNS user and the advertising account exclusive for advertising may be allocated. The advertising server 3 manages advertising of the advertiser having the advertising account and instructs display of the advertisement targeting a predetermined SNS user to the SNS server 2, that is, distributes the advertisement to a predetermined target. The advertiser can manage requests and settings of the advertisements when logging in the advertising server 3 by using the allocated advertising account.

Moreover, if the advertiser grants a predetermined manager a permission of advertisement management, the advertising server 3 may allocate a management account associated with the advertising account of the advertiser to the manager. The management account can be distributed to the manager depending on permission of the advertiser. The manager can manage requests and settings of the advertisements when logging in the advertising server 3 by using the allocated management account. Incidentally, if the management account is allocated, the advertising server 3 can set restriction among a range according to a demand of the advertiser and restrict advertisement management of the manager using the management account within the set range. Hereinafter, because advertisement management of the manager is similar to advertisement management of the advertiser, its description is omitted.

The advertisement provided while being attached to the SNS in the advertising server 3 of the embodiment is created as a hierarchical structure composed of the advertising account, a campaign, an advertisement set and a published advertisement.

The advertising account is information exclusive for the advertiser (identification information), and is positioned at the highest order in the above-described hierarchical structure. The advertising account is identified, for example, by an ID or a password exclusive for the advertiser and the advertiser can log in the advertising server 3 by having the advertising server 3 authenticate the ID and the password.

The campaign is information for indicating an advertising objective and others, and is positioned at the lower order than the advertising account (the second order) in the above-described hierarchical structure. The advertising server 3 is configured so that the advertiser can set one or more campaigns to one advertising account. Each campaign can be identified, for example, by a campaign ID or a campaign name and the advertiser can set a desired campaign name to the advertising server 3.

The advertising server 3 can set, as the campaign, one of various advertising objectives, such as "increase accesses of website", "increase conversion of website", "advertising post", "advertising SNS site", "increase the number of installation of application", "increase engagement of application", "increase participants of event", "increase acquisition of coupon" and "increase the number of views of movie".

The advertisement set is information indicating combination (pattern) of a target, a budget, a bidding price, a publication period and others of the advertisement, and is positioned at the lower order than the campaign (the third order) in the above-described hierarchical structure. The advertising server 3 is configured so that the advertiser having the advertising account can set one or more advertisement sets to each campaign. Each advertisement set can be identified, for example, by an advertisement set ID or an advertisement set name and the advertiser can set a desired advertisement set name to the advertising server 3.

The advertising server 3 can set, as the target, "location", "age", "gender", "language" and others, and further set in detail "relationship", "educational background", "work experience", "ethnic group", "generation", "parent", "politics", "life event" and others. Moreover, the advertising server 3 can set, as the budget, a final budget, a budget per day and others, and can set, as the bidding price, an average cost, a cost for each advertisement set and others. Further, the advertising server 3 can set, as the publication period, a start date, an end date and continuous publication.

The published advertisement is an advertisement itself published on the SNS site and is composed of advertising materials, such as image and text. The published advertisement is positioned at the lower order than the advertisement set (the fourth order, the lowest order) in the above-described hierarchical structure. The advertising server 3 is configured so that the advertiser having the advertising account can set one or more published advertisements to each advertisement set. Each published advertisement can be identified, for example, by a published advertisement ID or a published advertisement name and the advertiser can set a desired published advertisement name to the advertising server 3.

The advertising server 3 can set, to one advertisement set, a plurality of published advertisements being different depending on kinds of terminals or kinds of SNSs on which the advertisement is published, for instance. The advertising server 3 defines an advertising screen of a determined size for creating the published advertisement in advance and the advertiser can set the advertising material, such as image and text, to the advertising screen by desired arrangement.

Further, the advertising server 3 collects progress information of the budget and the period of the advertisement published under each advertisement set, separately from the above-described hierarchical structure. The progress information of the budget can be calculated on the basis of the budget and the cost set as the operation information or on the basis of results publication of the advertisement of the advertising server 3, or alternatively, can be calculated for each term, such as day, week or month. As the progress information of the budget, for example, there are a budget, a spent amount, a spent rate, a budget balance, an estimated budget per day, a spent amount of today, a spent rate of today, a balance of today and others. The progress information of the period can be calculated on the basis of period information, such as a start date and an end date, set as the operation information or on the basis of a time lapse in the advertising server 3. As the progress information of the period, for example, there are a spending pace, the number of progressed days, a rate of the number of progressed days, the number of remaining days and others.

Moreover, the advertising server 3 collects a plurality of performance information (impression, click and others) indicating performance of the advertisement published under each advertisement set. As the performance information, for instance, access to the SNS site publishing the advertisement or to its advertisement from the user terminal 6, or operation of the user terminal 6 to the SNS site or the advertisement may be detected by the SNS server 2 and informed to the advertising server 3, or alternatively, may be detected by the advertising server 3.

As the performance information, for example, there are performance information according to display of the published advertisement, performance information according to click to the published advertisement, performance information according to action to the published advertisement, performance information according to conversion of the published advertisement and others. As the performance information according to display of the published advertisement, there are impression, cost per impressions (CPM), reach, CPP (uCPM), social impression, social CPM, social reach, social CPP, frequency and others. As the performance information according to click to the published advertisement, there are click through rate (CTR), CTR (unique), the number of clicks, cost per click (CPC), the number of people taking click, unique click (cost), social click, the number of people taking social click and others. As the performance information according to action to the published advertisement, there are the number of actions, cost per action (CPA), the number of people taking action, the number of people taking action (cost), actions/impressions, action value and others. As the performance information according to conversion of the published advertisement, there are the number of conversions of objectives, cost of conversion of objective, conversions/impressions, CVR of objective, conversion value of objective and others. Moreover, the performance information according to action to the published advertisement as described above is the total of the performance information of various actions. For example, as the action to the published advertisement, there are various kinds of actions, such as page engagements/in-store sales, post engagement, website conversion, mobile application, PC application, movie viewing and commercial event. The advertising server 3 can collect the performance information for each item, such as a cost, the number and a unique value of each action.

Incidentally, the advertising server 3 includes an application programming interface (API) for executing logging-in of the advertising account of the advertiser, acquiring of advertising information (the campaign, the advertisement set and the published advertisement), setting of each operation information of the advertisement set and viewing of the performance information, in advance. In other words, the advertising server 3 allows setting of each operation information of the advertisement set and viewing of the performance information with regard to the advertisement of the advertising account logged-in by utilizing the API.

Next, the advertisement management device 4 will be described. Incidentally, in the advertisement management system 1, a plurality of advertisement management devices 4 are arranged, but FIG. 1 illustrates one advertisement management device 4, for convenience of description.

The advertisement management device 4 is adapted to provide an advertisement management tool to the advertiser and the manager granted a permission of advertisement management in the advertising server 3 and allocates individual use accounts of the advertisement management tool to the advertiser and the manager. The use account is associated with the advertising account of the advertiser or the management account of the manager (the advertising account associated with the management account of the manager) and is preserved in the advertisement management device 4. Incidentally, the use account may be the same one as the advertising account of the advertiser or the management account of the manager. The advertiser or the manager can use the advertisement management tool when logging in the advertisement management device 4 by using the allocated use account. Incidentally, the manager can use the advertisement management tool within the restriction range permitted by the advertiser, as similar to the advertiser.

The advertisement management device 4 is a device including, for example, a controller 10, a storage 11, a communicator 12 and an advertisement management tool provider 13 and being capable of executing programs as a personal computer (PC) or a server. The advertisement management tool provider 13 may be configured as a program being stored in the storage 11 and operating on the basis of control by the controller 10.

The controller 10 is configured to have a central processing unit (CPU) or the like and to integrally control the whole operation of the advertisement management device 4. The storage 11 is configured to have a memory, such as a read only memory (ROM) and a random access memory (RAM), and a recording medium, such as a hard disc, and to store information, data, program and others controlled by the controller 10.

The communicator 12 is an interface for connecting the advertisement management device 4 with the network 5, such as an internet, that is, connects the advertisement management device 4 with the advertising server 3 and the management terminal 7 via the network 5. The advertisement management device 4 is configured to be capable of utilizing the API prepared in the advertising server 3 when the communicator 12 is connected with the advertising server 3 via the network 5. Moreover, the advertisement management device 4 is connected with the management terminal 7 via the network 5 when the communicator 12 receives access from the management terminal 7 via the network 5.

The advertisement management tool provider 13 is adapted to provide the advertisement management tool to the management terminal 7 connected to the advertisement management device 4 as described above, for instance, to provide the advertisement management tool actualized by a website or an application. In the embodiment, the advertisement management tool provider 13 providing the advertisement management tool actualized by the website will be described.

Figure 8:
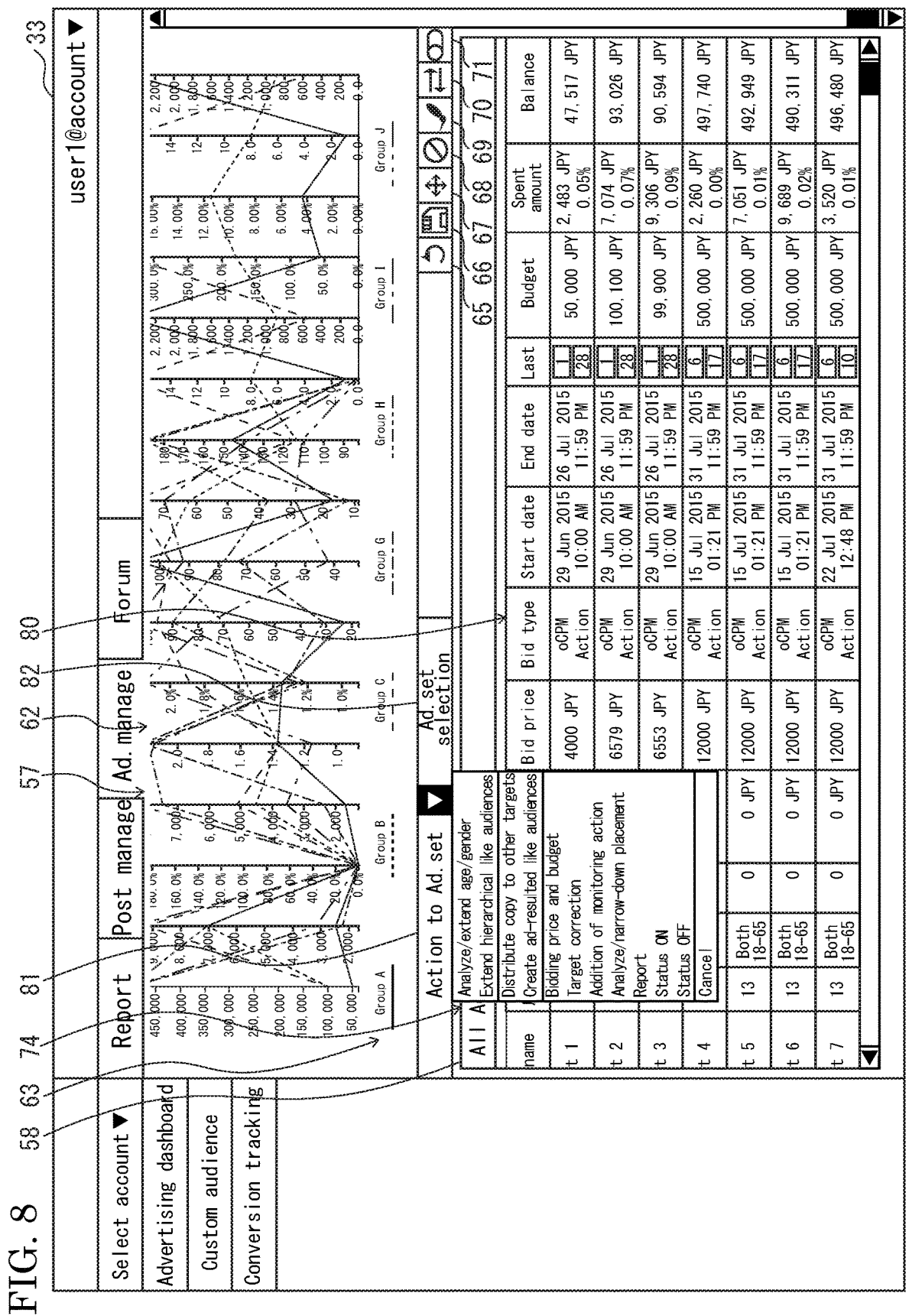
FIG. 8 It is a schematic diagram showing an example of a lower portion of the advertisement set management screen provided by the advertisement set management screen providing section of the advertisement management device in the advertisement management system in accordance with the embodiment of the present invention.
Figure 9:
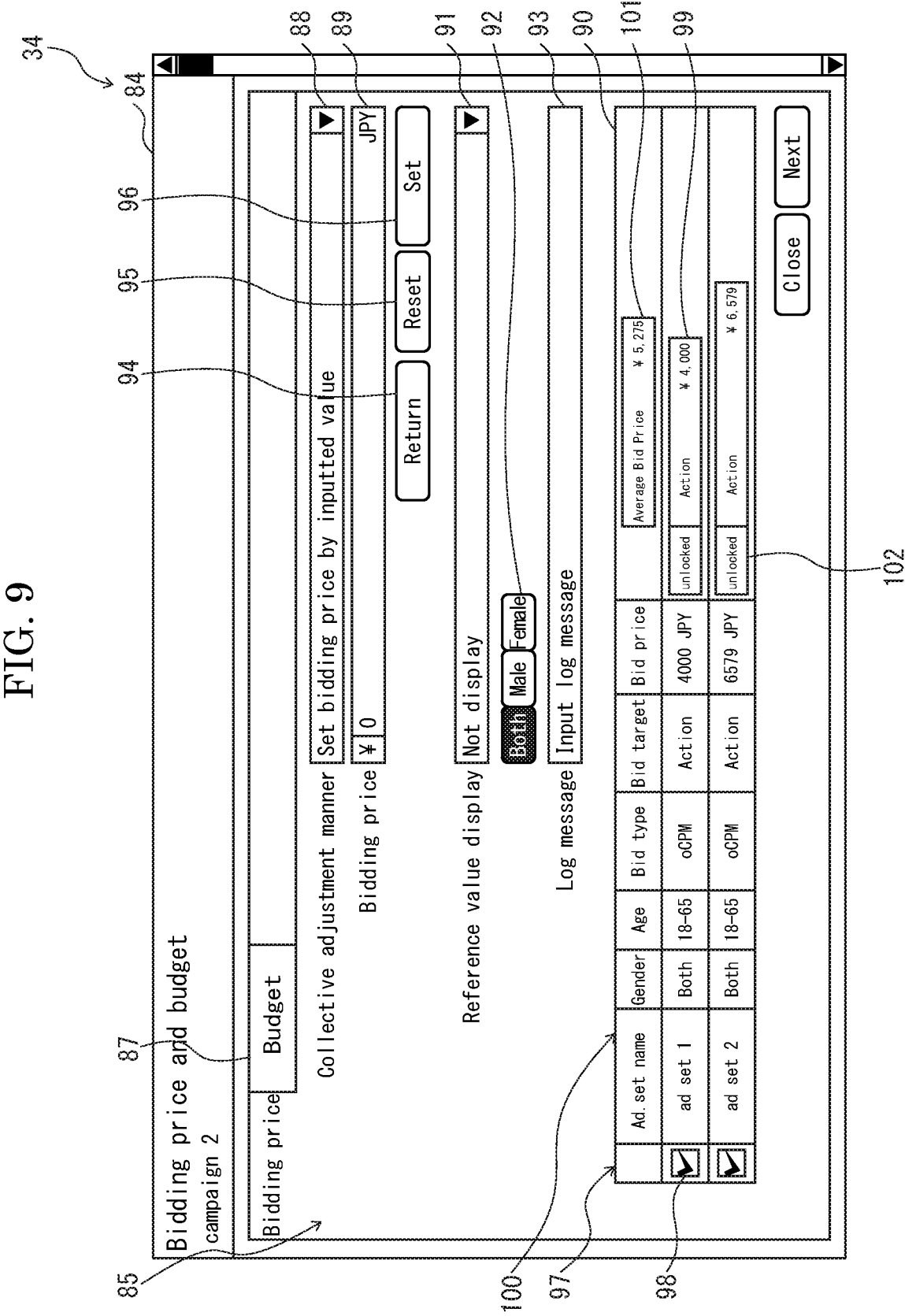
FIG. 9 It is a schematic diagram showing an example of a bidding price adjustment screen as an advertisement set adjustment screen provided by an advertisement set adjustment screen providing section of the advertisement management device in the advertisement management system in accordance with the embodiment of the present invention.
Figure 10:
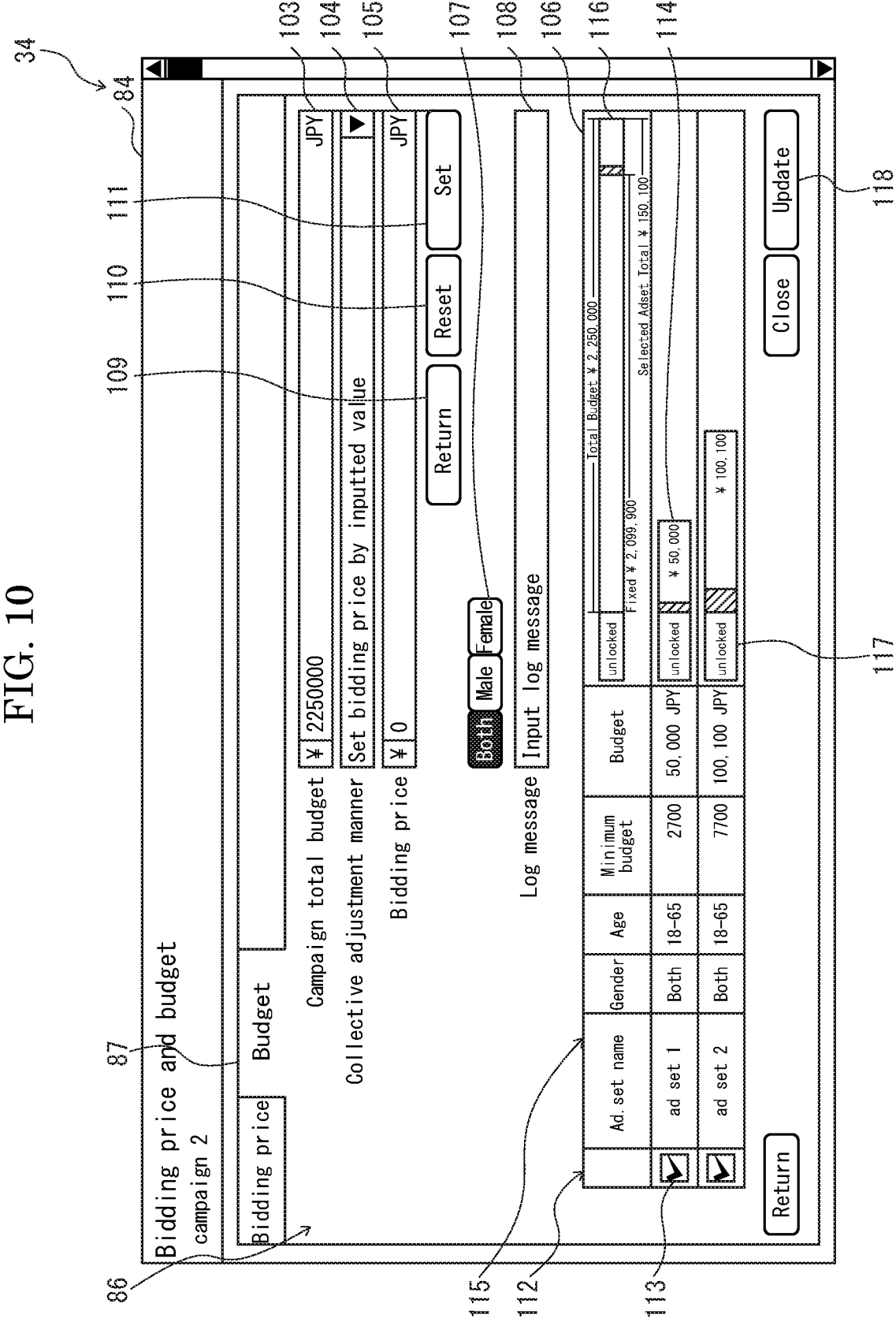
FIG. 10 It is a schematic diagram showing an example of a budget adjustment screen as the advertisement set adjustment screen provided by the advertisement set adjustment screen providing section of the advertisement management device in the advertisement management system in accordance with the embodiment of the present invention.

The advertisement management tool provider 13 is configured to provide, as websites of the advertisement management tool, a log-in screen 30 (refer to FIG. 2), a tool start screen 31 (refer to FIG. 3), a campaign management screen 32 (refer to FIG. 4), an advertisement set management screen 33 (refer to FIGS. 5, 7 and 8) and an advertisement set adjustment screen 34 (refer to FIGS. 9 and 10). The advertisement management tool provider 13 includes a log-in screen providing section 15, a use account authenticating section 16, a tool start screen providing section 17, a campaign management screen providing section 18, an advertisement set management screen providing section 19 and an advertisement set adjustment screen providing section 20, in order to provide each website of the advertisement management tool.

Figure 2:
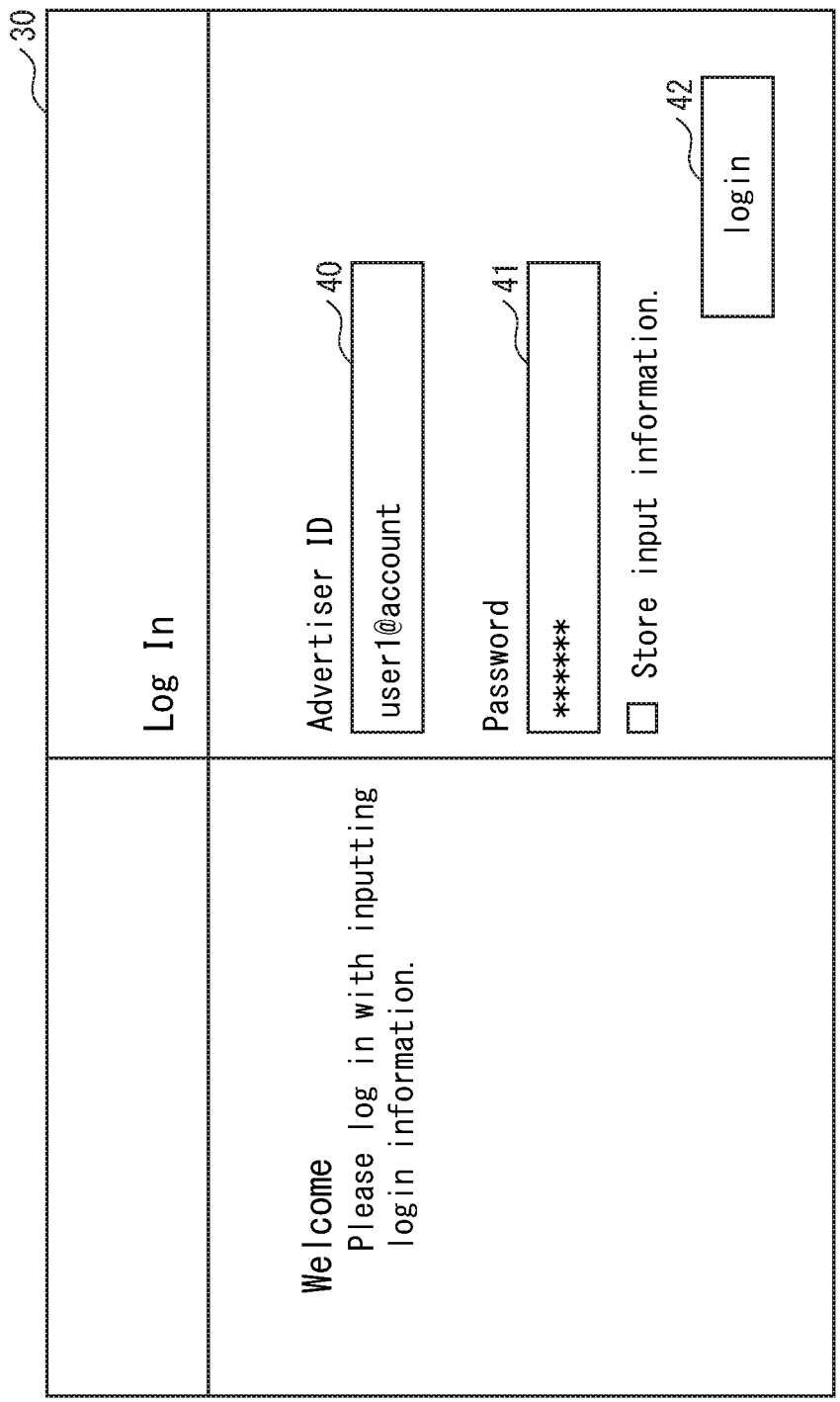
FIG. 2 It is a schematic diagram showing an example of a log-in screen provided by a log-in screen providing section of an advertisement management device in the advertisement management system in accordance with the embodiment of the present invention.

The log-in screen providing section 15 provides the website of the log-in screen 30 as shown in FIG. 2 used for input of the use account (log-in operation) to the management terminal 7 connected with the advertisement management device 4 at first. The log-in screen providing section 15 provides, for instance, the log-in screen 30 on which an input box 40 for ID, an input box 41 for a password and a log-in button 42 of the use account are displayed.

The use account authenticating section 16 executes authentication process of the use account when input of the use account is carried out in the management terminal 7 to which the website of the log-in screen 30 is provided by the log-in screen providing section 15. If the use account authenticating section 16 authenticates the use account, the use account authenticating section 16 utilizes the API of the advertising server 3 with use of the advertising account associated with the use account to execute logging in the advertising server 3. If logging in the advertising server 3 with use of the advertising account associated with the use account is established, the management device 7 becomes a log-in state with regard to the advertisement management tool and the advertisement management tool (the advertisement management device 4) becomes a state capable of acquiring the advertising information (the campaign, the advertisement set and the published advertisement) relating to the advertising account by utilizing the API.

Figure 3:
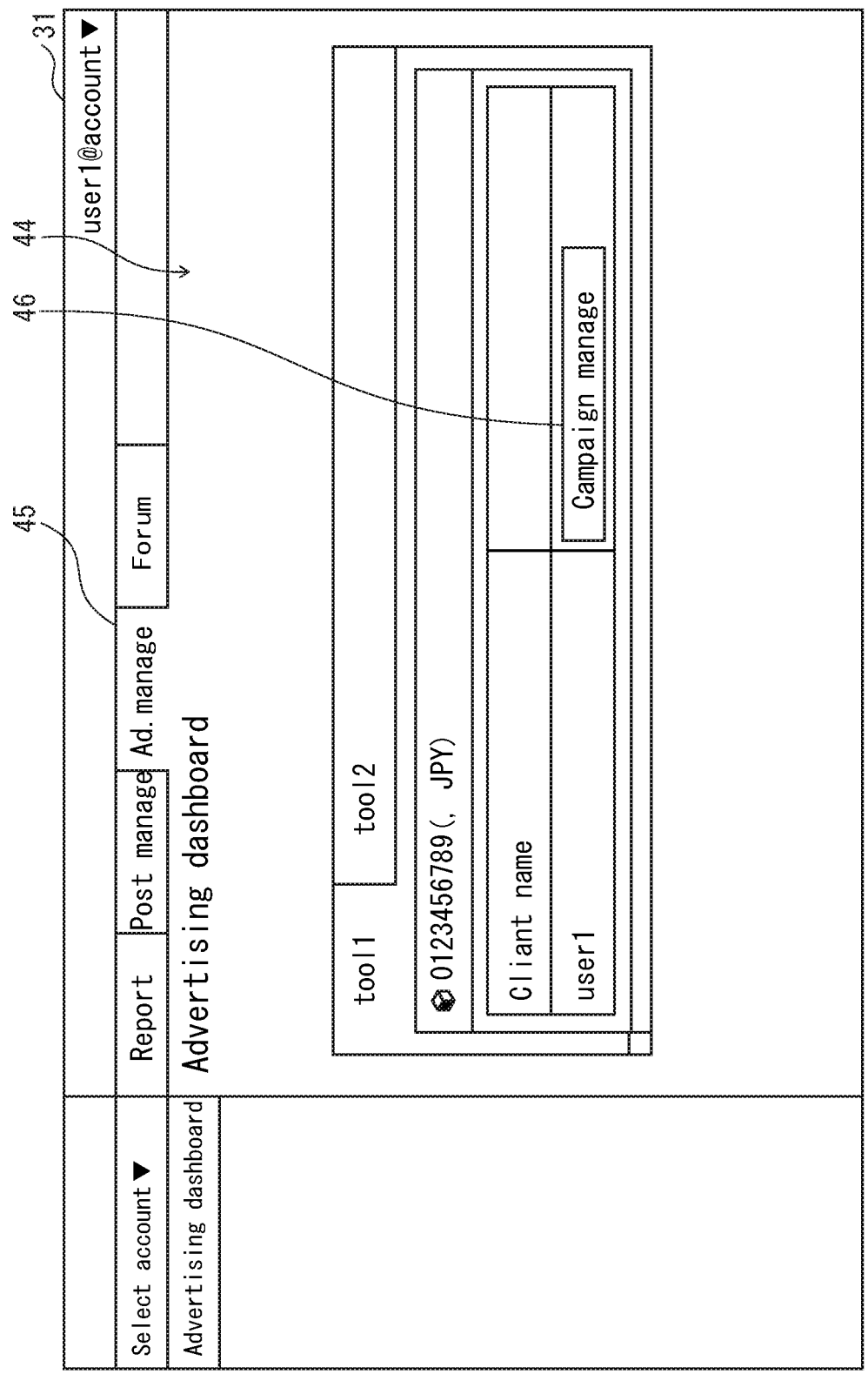
FIG. 3 It is a schematic diagram showing an example of a tool start screen provided by a tool start screen providing section of the advertisement management device in the advertisement management system in accordance with the embodiment of the present invention.

The tool start screen providing section 17 provides the website of the tool start screen 31 as shown in FIG. 3 used for operating use start of the advertisement management tool when the management device 7 becomes a log-in state with regard to the advertisement management tool by the authentication process of the use account authenticating section 16

The tool start screen 31 is configured, for instance, to switch and display an advertisement management start screen 44 shown in FIG. 3, and a report displaying screen (not shown) and a post management start screen (not shown), and includes a menu tab 45 for switching these screens. Incidentally, the menu tab 45 may be displayed not only on the tool start screen 31, but also on the campaign management screen 32 and the advertisement set management screen 33. Moreover, on the tool start screen 31, exclusive information of the advertiser and information relating to the advertising account may be displayed.

The advertisement management start screen 44 includes a campaign management screen button 46 for displaying the campaign management screen 32 in the management terminal 7 and the tool start screen providing section 17 instructs display of the campaign management screen 32 to the campaign management screen providing section 18 depending on operation of the campaign management screen button 46.

Figure 4:
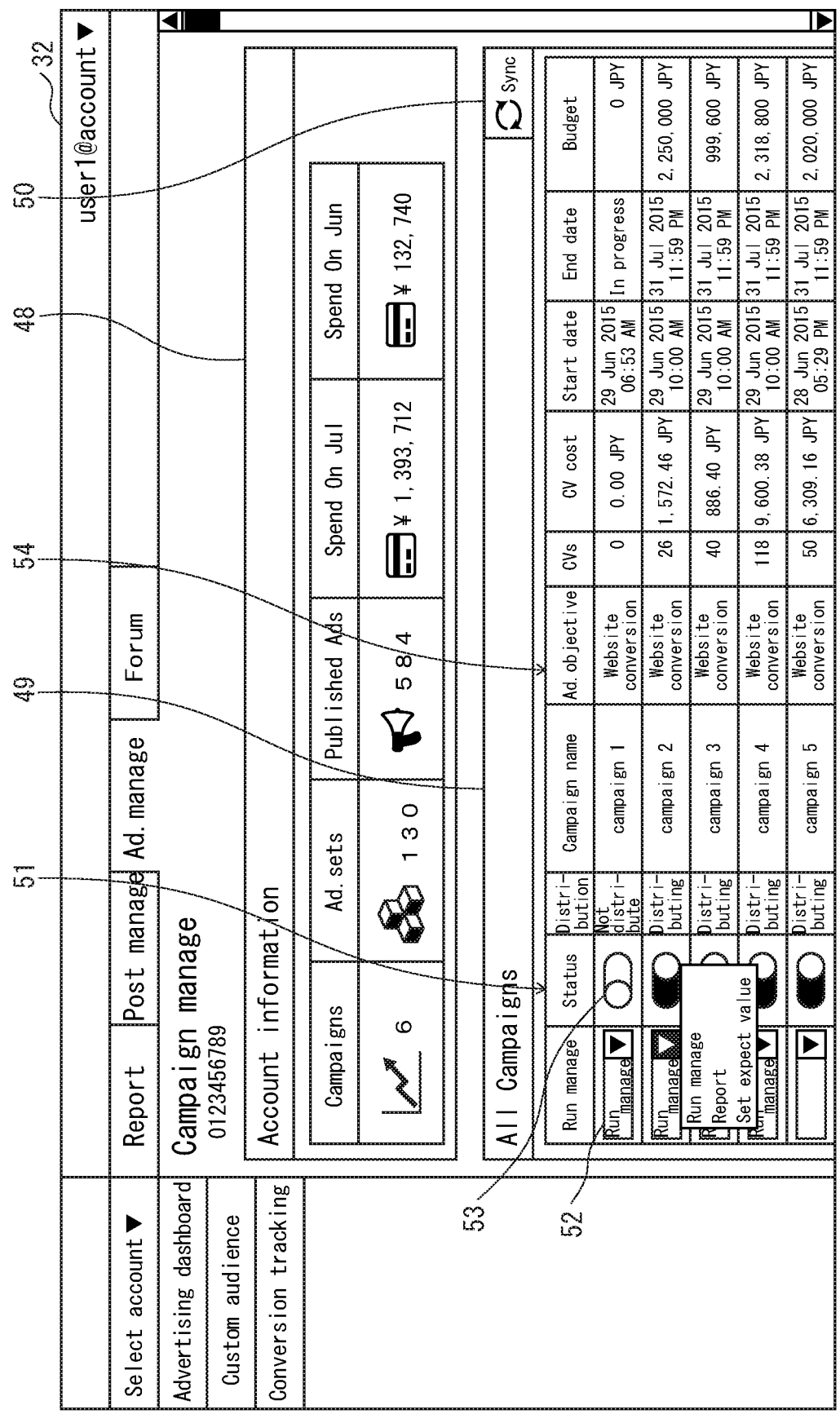
FIG. 4 It is a schematic diagram showing an example of a campaign management screen provided by a campaign management screen providing section of the advertisement management device in the advertisement management system in accordance with the embodiment of the present invention.

The campaign management screen providing section 18, when receiving display instruction of the campaign management screen 32 from the tool start screen providing section 17, utilizes the API to acquire information relating to the campaign attached to the advertising account from the advertising server 3 and provides the website of the campaign management screen 32 as shown in FIG. 4 using the acquired information to the management terminal 7.

On the campaign management screen 32, an account information column 48 for indicating summary information of the advertising attached to the advertising account and a campaign list column 49 for collectively listing and indicating summary information of all campaigns attached to the advertising account are displayed. Moreover, the campaign management screen 32 includes a server synchronization button 50 and the campaign management screen providing section 18, depending on operation of the server synchronization button 50, reacquires information relating to the advertising from the advertising server 3 and redisplays the campaign management screen 32.

On the account information column 48, for example, the number of all campaigns, the number of all advertisement sets, the number of all published advertisements and costs spent for the advertising of this month and last month attached to the advertising account are displayed.

On the campaign list column 49, a list of information of all campaigns is displayed, and, on operation items 51 of each campaign on this list, a campaign management executing button 52 applying a drop-down list of management items executable with regard to the campaign and a status button 53 used for switching statuses of the campaign are operatably displayed. Moreover, on display items 54 of each campaign on this list, "campaign name", "advertising objective", "the number of conversions (CV) of objectives", "cost of CV of objective", "expected action", "start date", "end date", expected spent budget", "budget", "spent amount", "balance" and others are displayed. In the campaign management executing button 52, for example, the management items, such as "running management", "report" and "set/edit of expected value", are selectively displayed and, when any management item is selected by the campaign management executing button 52, the campaign management screen providing section 18 shifts process to display of a management screen of each management item.

In the embodiment, particularly, when "running management" is selected by the campaign management executing button 52 with regard to one campaign (a target campaign) as a management target, the campaign management screen providing section 18 instructs display of the advertisement set management screen 33 to the advertisement set management screen providing section 19 in order to display the advertisement set management screen 33 about this target campaign in the management terminal 7. Moreover, similarly, when "report" or "set/edit of expected value" is selected, the campaign management screen providing section 18 makes a report screen providing section (not shown) or an expected value set/edit screen providing section (not shown) operated to display a report screen (not shown) or an expected value set/edit screen (not shown).

Figure 5:
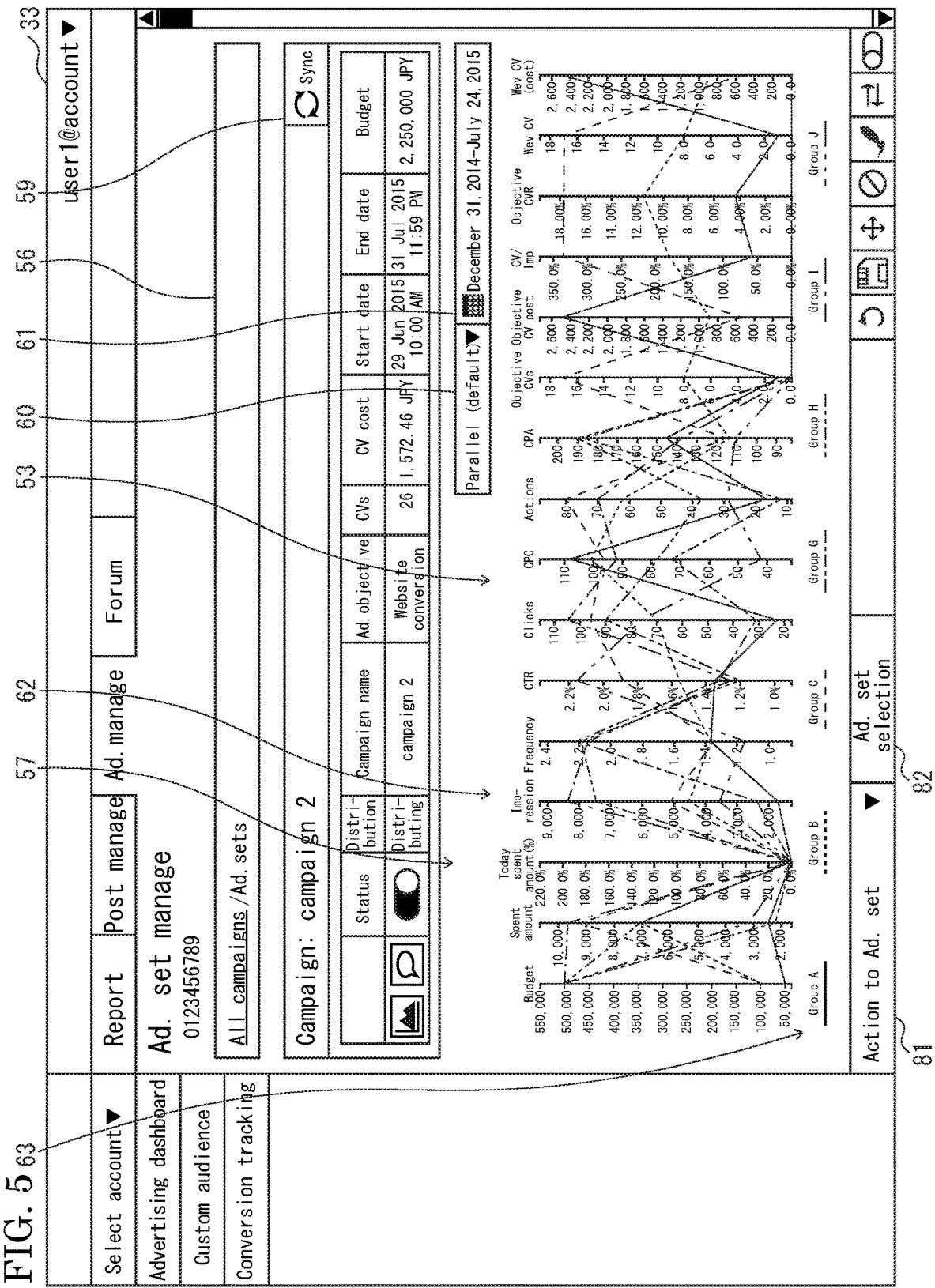
FIG. 5 It is a schematic diagram showing an example of an upper portion of an advertisement set management screen provided by an advertisement set management screen providing section of the advertisement management device in the advertisement management system in accordance with the embodiment of the present invention.
Figure 7:
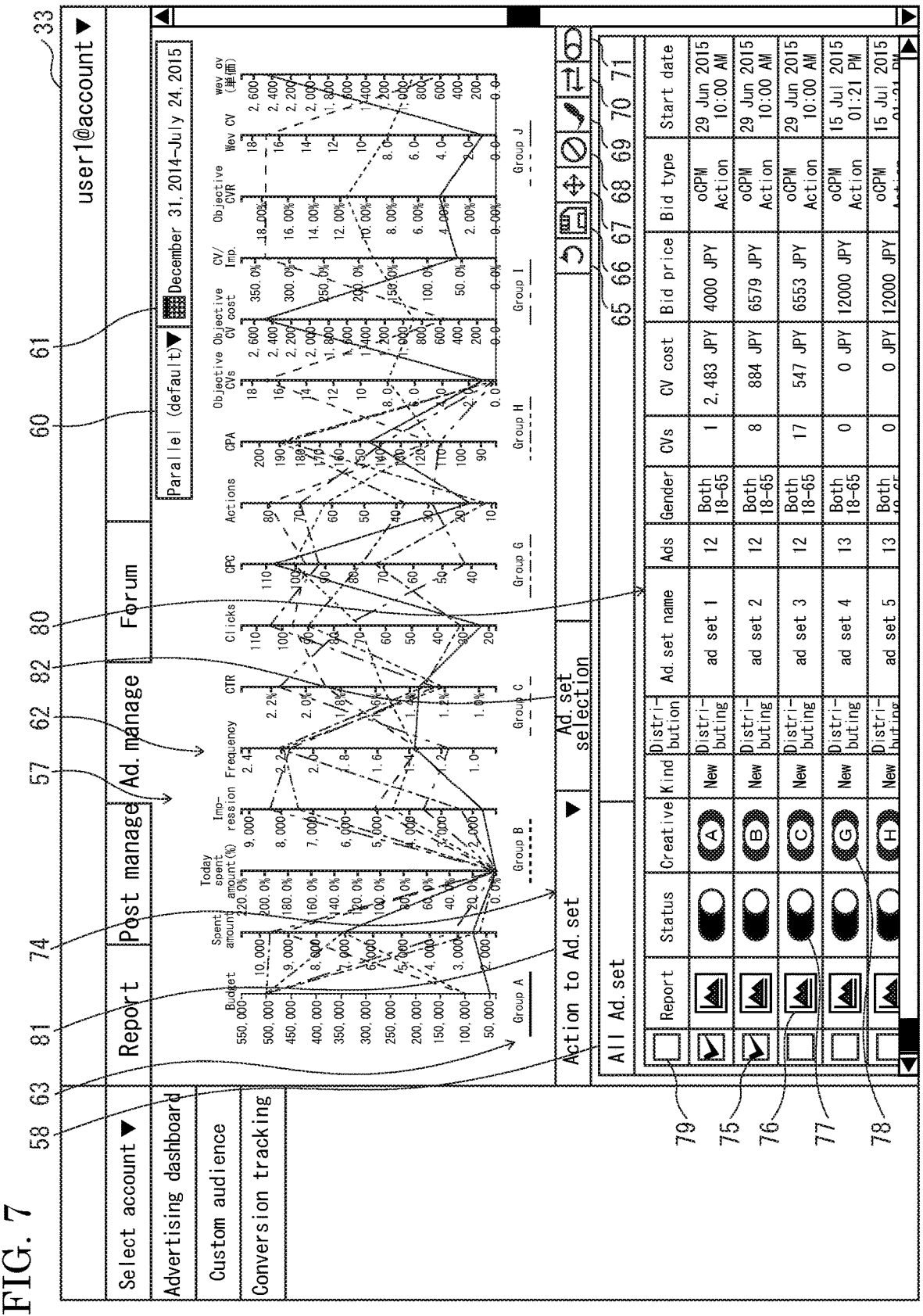
FIG. 7 It is a schematic diagram showing an example of a center portion of the advertisement set management screen provided by the advertisement set management screen providing section of the advertisement management device in the advertisement management system in accordance with the embodiment of the present invention.

The advertisement set management screen providing section 19, when receiving display instruction of the advertisement set management screen 33 from the campaign management screen providing section 18, provides the website of the advertisement set management screen 33 to the management terminal 7. At this time, the advertisement set management screen providing section 19 utilizes the API to acquire, from the advertising server 3, information relating to the advertisement set attached to (contained in) the target campaign about selection of "running management" in the campaign management screen 32 and creates the advertisement set management screen 33 as shown in FIGS. 5, 7 and 8 by using the acquired information.

On the advertisement set management screen 33, if it is created in a shape elongated in a vertical direction (upward and downward directions) beyond a displayable range of the management terminal 7, a screen slide bar capable of sliding on a screen in the upward and downward directions is displayed. FIG. 5 illustrates a state that the screen slide bar is shifted to an upper end and that an upper portion of the advertisement set management screen 33 is displayed in the management terminal 7. FIG. 7 illustrates a state that the screen slide bar is shifted to the vicinity of the center in the upward and downward directions and that the vicinity of the center of the advertisement set management screen 33 is displayed in the management terminal 7. FIG. 8 illustrates a state that the screen slide bar is shifted to a lower end and that a lower portion of the advertisement set management screen 33 is displayed in the management terminal 7.

On the advertisement set management screen 33, a campaign item column 56 for indicating the roughly same contents as the operation items 51 and the display items 52 of the target campaign about selection of "running management" in the campaign management screen 32, a graph column 57 for displaying in a graph the progress information and the performance information of the budget and the period of the advertisement sets attached to the target campaign, and an advertisement set list column 58 for collectively listing and indicating summary information of the advertisement sets attached to the target campaign are displayed.

Moreover, the advertisement set management screen 33 includes a server synchronization button 59 and the campaign management screen providing section 18, depending on operation of the server synchronization button 59, reacquires information relating to the advertising from the advertising server 3 and redisplays the advertisement set management screen 33. Further, the advertisement set management screen 33 includes a graph selection button 60 for changing a kind of a graph displayed on the graph column 57 and a period change button 61 for changing the period during which information of the advertisement sets for constructing the graph displayed on the graph column 57 are acquired.

The graph column 57 displays, in the initial state, a parallel coordinate graph 62 (refer to FIG. 6) having evaluation axes (basis axes) of various progress information and performance information of the budget and the period of the advertisement set and plotting their of each advertisement set. The graph selection button 60 allows selection of time series graphs, such as "the number of CVs of objectives", "cost of CV of objective", "CVs/impressions" and "CVR of objective", in addition to the "parallel coordinate graph". Hereinafter, a case where the parallel coordinate graph 62 is displayed on the graph column 57 will be described and the parallel coordinate graph 62 is called as a graph 62 simply.

In the graph 62 of the graph column 57, one or more advertisement sets are plotted in line graphs of difference colors, respectively. Below the graph 62, combinations 63 associating the color of the line graph and a group name of each advertisement set are collectively displayed. When any one of the combination is selected, the line graph of only the selected advertisement set may be remarkably displayed. In the graph 62, a plurality of evaluation axes (basis axes) as vertical axes are arranged in parallel in a horizontal direction, and each evaluation axis indicates any one of various progress information and performance information of the budget and the period of the advertisement set. A maximum value and a minimum value of each evaluation axis may be determined, in the initial state, on the basis of a maximum value and a minimum value of information (the progress information and the performance information) of the advertisement set attached to the campaign. The kind of the progress information and the performance information of each evaluation axis can be changed in a display item setting screen 72 (refer to FIG. 11) as follows.

Figure 6:
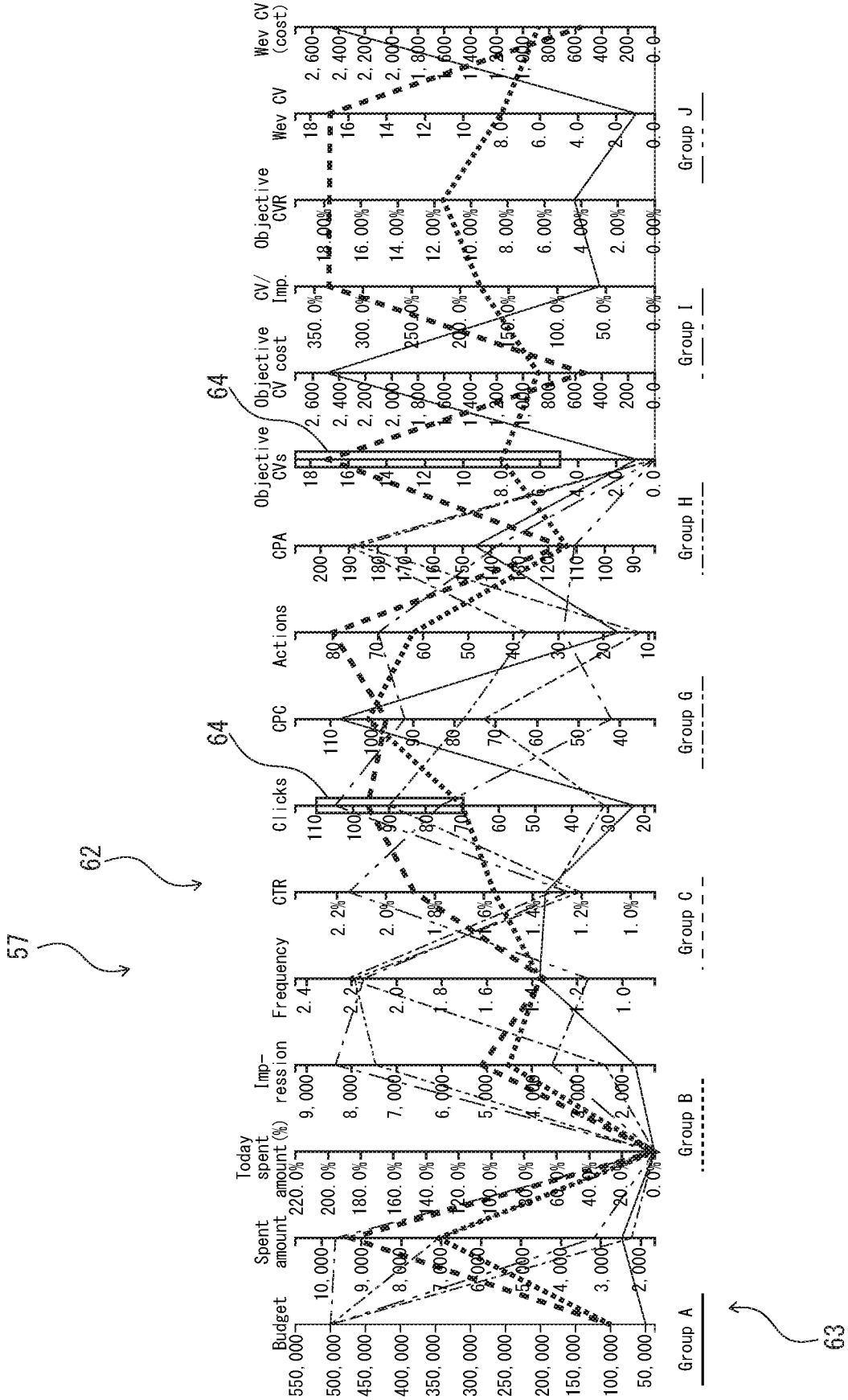
FIG. 6 It is a schematic diagram showing an example of a parallel coordinate graph of the advertisement set management screen provided by the advertisement set management screen providing section of the advertisement management device in the advertisement management system in accordance with the embodiment of the present invention.

The graph column 57 is configured so as to be capable of obtaining a scope narrowed-down depending on slide operation, such as touch operation or cursor operation, on each evaluation axis of the graph 62 and, in a directed scope depending on the slide operation on each evaluation axis, a directed scope bar 64 is displayed as shown in FIG. 6. In the graph column 57, a narrowed-down scope is determined within the directed scope or out of the directed scope and the advertisement set within the narrowed-down scope is displayed more remarkable than the advertisement set out of the narrowed-down scope. For instance, the advertisement set within the narrowed-down scope is displayed in the line graph of the above-described color and the advertisement set out of the narrowed-down scope is displayed in the line graph of a lighter color than normal one. Incidentally, narrowing-down of the scope as described above may be carried out with regard to a plurality of evaluation axes. Moreover, the parallel coordinate graph 62 may be configured so that thickness of the line of each advertisement set is changed depending on the number of advertisement sets within the narrowed-down scope. For instance, as the number of advertisement sets within the narrowed-down scope increases, the thicker line may be displayed, and as the number of advertisement sets within the narrowed-down scope decreases, the thinner line may be displayed.

Moreover, the advertisement set management screen 33 includes, as a menu for operating the graph 62 of the graph column 57, a reset button 65, an image output button 66, a scale button 67, a rescale button 68, a directed scope mode switching button 69, a directed scope inversion button 70 and a display item setting button 71.

The reset button 65 is arranged in order to restore the graph 62 changed by the directed scope and scaling to the initial state. The image output button 66 is arranged in order to output an image of the graph 62 presently displayed, for instance, is arranged to allow selection of a file for saving and a high quality file for printing.

The scale button 67 is arranged in order to redisplay the graph 62 of only the advertisement sets positioned within the above-described narrowed-down scope and the maximum value and the minimum value of each evaluation axis after redisplaying are changed depending on the advertisement sets positioned within the narrowed-down scope. The rescale button 68 is arranged in order to restore the scale of the graph 62 changed by the scale button 67, for instance, may be restore only the last scale operation.

The directed scope mode switching button 69 is arranged in order to switch whether or not the narrowed-down scope contains the directed scope, that is, whether the narrowed-down scope is determined by within the directed scope or out of the directed scope. The directed scope inversion button 70 is adopted to be turned ON or OFF, and is set to an OFF state normally. If it is set to an ON state, the advertisement sets out of the narrowed-down scope are displayed more remarkable than the advertisement sets within the narrowed-down scope. For instance, the advertisement set out of the narrowed-down scope is normally displayed in the line of the above-described color and the advertisement set within the narrowed-down scope is displayed in the line of a lighter color than normal one. That is, the directed scope inversion button 70 is turned to the ON state, display of the advertisement sets in the graph 62 is inverted between the inside and the outside of the narrowed-down scope.

The display item setting button 71 is arranged in order to display the display item setting screen 72 (refer to FIG. 11) for changing a kind of the progress information and the performance information of each evaluation axis. On the display item setting screen 72, as shown in FIG. 11, the progress information and the performance information of the budget and the period are displayed by individual check boxes 73 and checked information is added as the evaluation axis of the graph 62.

Moreover, a case where the time series graph, such as "the number of CVs of objectives", "cost of CV of objective", "CVs/impressions" and "CVR of objective" is displayed on the graph column 57 will be described.

If "the number of CVs of objectives", "cost of CV of objective", "CVs/impressions" or "CVR of objective" is selected by the graph selection button 60, the time series graph of the advertisement sets selected by the check boxes 75 of the advertisement set list column 58 at the last time is displayed on the graph column 57. In the time series graph, a value of the selected "the number of CVs of objectives", "cost of CV of objective", "CVs/impressions" or "CVR of objective" is plotted on a basis axis as a vertical axis and basis axes for respective dates are arranged in parallel in a horizontal direction. The time series graph is configured, similar to the parallel coordinate graph 62, so as to be capable of obtaining a scope narrowed-down depending on slide operation, such as touch operation or cursor operation, on each evaluation axis. On the time series graph, a basis axis of a predetermined period in the horizontal direction is displayed and the progress information and the performance information of the advertisement set are displayed within a range of the predetermined period. In the time series graph, the displayed period may be shifted to a preceding or following side by slide operation in the horizontal direction, such as touch operation or cursor operation.

On the advertisement set list column 58, in the initial state, a list composed of information of all advertisement sets attached to the campaign is displayed. Moreover, if the narrowed-down scope on the above-described graph column 62 is determined, on the advertisement set list column 58, the list composed of information of only the advertisement sets within the narrowed-down scope is displayed.

In operation items 74 of each advertisement set on the list of the advertisement set list column 58, check boxes 75 for selecting the advertisement set targeted for execution of following management functions (hereinafter, called as a target advertisement set) among the advertisement sets displayed on the advertisement set list column 58, report buttons 76 for displaying a report screen (not shown) of the advertisement set, status buttons 77 used for switching statuses of the advertisement set, and creative buttons 78 for displaying a sample of the published advertisement (not shown) attached to the advertisement set are operatably displayed.

The check box 75 of the advertisement set list column 58 can be set to ON with regard to a plurality of target advertisement sets. Incidentally, above the check box 75 of each advertisement set, a collective check box 79 for switching ON and OFF of the check boxes 75 of all advertisement sets is arranged. To the creative button 78 of each advertisement set, the same color as the line of each advertisement set in the graph 62 is applied and the same group name is applied.

Further, in display items 80 of each advertisement set on the list of the advertisement set list column 58, "classification", "distribution condition", "advertisement set name", "the number of advertisements", "target (gender, age)", "the number of CVs of objectives", "cost of CV of objective", "bidding price", "bidding type", "start date", "end date", "the number of remaining days", "budget", "spent amount", "balance" and others are displayed. Incidentally, above the display item 80 of each advertisement set, the total of budget balance of the advertisement sets displayed on the advertisement set list column 58 is displayed.

Moreover, the advertisement set management screen 33 includes a management function executing button 81 and an advertisement set selection button 82. The management function executing button 81 is arranged in order to execute various management functions with regard to the target advertisement sets of which check boxes 75 of the advertisement set list column 58 are turned ON and, on the management function executing button 81, various management functions are selectively displayed by a drop-down list.

For example, as the management functions, there are "analysis and extension of age and gender", "extension of hierarchical lookalike audiences", "distribution of copy to other targets", "creation of advertising result type lookalike audiences", "bidding price and budget", "period", "target correction", "addition of monitoring action", "analysis and narrowing-down of placement", "status ON", "status OFF" and others. In the embodiment, particularly, when "bidding price and budget" with regard to the target advertisement sets is selected by the management function executing button 81, the advertisement set management screen providing section 19 instructs display of the advertisement set adjustment screen 34 to the advertisement set adjustment screen providing section 20 in order to display the advertisement set adjustment screen 34 about all target advertisement sets in the management terminal 7.

The advertisement set adjustment screen providing section 20, when receiving display instruction of the advertisement set adjustment screen 34 from the advertisement set management screen providing section 19, provides the website of the advertisement set adjustment screen 34 to the management terminal 7. At this time, the advertisement set adjustment screen providing section 20 creates the advertisement set adjustment screen 34 as shown in FIGS. 9 and 10 by using information relating to all target advertisement sets when the management function executing button 81 is operated in the advertisement set management screen 33. Moreover, the advertisement set adjustment screen providing section 20 may display the advertisement set adjustment screen 34 by pop-up on the advertisement set management screen 33.

On the advertisement set adjustment screen 34, an adjustment screen of various operation information with regard to all target advertisement sets when the management function executing button 81 is operated in the advertisement set management screen 33 is displayed. For instance, the advertisement set adjustment screen providing section 20 displays a bidding price/budget adjustment screen 84 as the advertisement set adjustment screen 34 when "bidding price and budget" is selected by the management function executing button 81 in the advertisement set management screen providing section 19.

The bidding price/budget adjustment screen 84 is configured to be capable of switching and displaying a bidding price adjustment screen 85 and a budget adjustment screen 86 and, for example, includes a menu tab 87 for switching these adjustment screens.

The bidding price adjustment screen 85 includes, as setting items, a collective adjustment manner selection list 88, a bidding price input box 89, a bidding price table 90, a reference value display selection list 91, a gender filter switching button 92 and a log message input box 93, and moreover, includes a return button 94, a reset button 95 and a set button 96 relating to applying of these.

On the collective adjustment manner selection list 88, manners for collectively adjusting the bidding prices with regard to all target advertisement sets are displayed by a drop-down list, for example, manners, such as "set bidding price by inputted value", "add/subtract inputted value to present bidding price", "percentages to present bidding price (set inputted percentages)", "percentages to each CV cost (set inputted percentages)", "percentages to each CPA (set inputted percentages)" and "percentages to each CPC (set inputted percentages)", are selectively displayed. The bidding price input box 89 is arranged in order to input a value of the bidding price or its percentages used for the manner selected in the collective adjustment manner selection list 88. Settings of the collective adjustment manner selection list 88 and the bidding price input box 89 are reflected to the bidding price displayed in the bidding price table 90 by operation of the set button 96.

On the bidding price table 90, information relating to the bidding price with regard to all target advertisement sets is collectively displayed. The bidding price table 90 includes, for example, as setting items 97 for each target advertisement set, check boxes 98 and bidding price slide bars 99 and includes, as displaying items 100 for each target advertisement set, "advertisement set name", "gender", "age", "bidding type", "bidding target" and "bidding price". In the bidding price table 90, change of the bidding price is allowed for the target advertisement sets of which the check box 98 is turned ON, but change of the bidding price is not allowed for the target advertisement sets of which the check box 98 is turned OFF.

The bidding price slide bar 99 is adapted to visualize an amount of the bidding price of each target advertisement set by a length of a bar extended in the horizontal direction. In the bidding price slide bar 99, when the length of the bar is changed by slide operation, such as touch operation or cursor operation, the bidding price of each target advertisement set displayed in the bidding price table 90 can be synchronously changed. For instance, as the bidding price slide bar 99 is lengthened, the bidding price is set higher, and as the bidding price slide bar 99 is shortened, the bidding price is set lower. To the bidding price slide bar 99, a paint-out color is applied so that its shade is varied synchronously according to the length, and then, as the bidding price slide bar 99 is lengthened, the color is set darker, and as the bidding price slide bar 99 is shortened, the color is set lighter.

Moreover, above the bidding price slide bar 99 of each target advertisement set, an average bidding price slide bar 101 is arranged. The average bidding price slide bar 101 is adapted to indicate an average bidding price of the bidding prices of the respective target advertisement sets, is configured similar to the bidding price slide bar 99 of each target advertisement set and is lengthened and shortened synchronously in linkage with the bidding price slide bar 99 of each target advertisement set. That is, when the average bidding price slide bar 101 is lengthened or shortened, the average bidding price is synchronously increased or decreased. In accordance with increase or decrease of the average bidding price, the bidding price of each target advertisement set is synchronously increased or decreased and the bidding price slide bar 99 is synchronously lengthened or shortened. Moreover, when the bidding price slide bar 99 of one target advertisement set is lengthened or shortened, the bidding price of each target advertisement set is synchronously increased or decreased. In accordance with increase or decrease of the bidding price, the average bidding price is synchronously increased or decreased and the average bidding price slide bar 101 is synchronously lengthened or shortened.

In addition, the bidding price slide bar 99 includes a lock/unlock switching button 102 and, when the lock/unlock switching button 102 is set to an unlock state, change of the bidding price is allowed, but, when the lock/unlock switching button 102 is set to a lock state, change of the bidding price is not allowed. Therefore, even if the average bidding price slide bar 101 is lengthened or shortened, the bidding price slide bar 99 of which the lock/unlock switching button 102 is set to the lock state is not lengthened or shortened, but other bidding price slide bar 99 in the unlock state is lengthened or shortened.

On the reference value display selection list 91, reference values superimposedly displayed on the bidding price slide bar 99 of each target advertisement set are displayed by a drop-down list, for example, items, such as "not displayed", "display CV cost", "display CPA" and "display CPC", are selectively displayed. The gender filter switching button 92 is a button for switching enable/disable of change of the bidding price according to the gender of the target of the target advertisement set. The log message input box 93 is arranged in order to write and record reason for decision of the bidding price and others, as a log.

On the bidding price adjustment screen 85, even if the bidding price of each target advertisement set displayed on the bidding price table 90 is changed, the bidding price table 90 is returned to the last condition (a condition before the last change) by operation of the return button 94 and is returned to the initial condition by operation of the reset button 95. The bidding price of each target advertisement set changed on the bidding price adjustment screen 85 is updated by an update button 118 arranged in the bidding price adjustment screen 85 or the budget adjustment screen 86, and then, is set to the advertising server 3 by utilizing the API.

The budget adjustment screen 86 includes, as setting items, a campaign total budget input box 103, a collective adjustment manner selection list 104, an advertisement set budget input box 105, an advertisement set budget table 106, a gender filter switching button 107 and a log message input box 108, and moreover, includes a return button 109, a reset button 110 and a set button 111 relating to applying of these.

The campaign total budget input box 103 is arranged in order to input an advertising budget of the whole campaign and displays the advertising budget of the whole campaign set in advance in the initial state.

On the collective adjustment manner selection list 104, manners for collectively adjusting the budgets with regard to all target advertisement sets are displayed by a drop-down list, for example, manners, such as "set budget to inputted value", "add/subtract inputted value to present advertisement set budget", "percentages to present advertisement set budget (set inputted percentages)", "set proportional value to prearranged bidding price (100 equals to a ratio of one to one, and a negative value indicates inverse proportion)", "set proportional value to CV cost (100 equals to a ratio of one to one, and a negative value indicates inverse proportion)", "set proportional value to CPA (100 equals to a ratio of one to one, and a negative value indicates inverse proportion)" and "set proportional value to CPC (100 equals to a ratio of one to one, and a negative value indicates inverse proportion)", are selectively displayed. The advertisement set budget input box 105 is arranged in order to input a value of the advertisement set budget or its percentages used for the manner selected in the collective adjustment manner selection list 104. Settings of the collective adjustment manner selection list 104 and the advertisement set budget input box 105 are reflected to the advertisement set budget displayed in the advertisement set budget table 106 by operation of the set button 111.

On the advertisement set budget table 106, information relating to the budget with regard to all target advertisement sets is collectively displayed. The advertisement set budget table 106 includes, for example, as setting items 112 for each target advertisement set, check boxes 113 and budget slide bars 114 and includes, as displaying items 115 for each target advertisement set, "advertisement set name", "gender", "age", "minimum budget" and "budget". In the advertisement set budget table 106, change of the budget is allowed for the target advertisement sets of which the check box 113 is turned ON, but change of the budget is not allowed for the target advertisement sets of which the check box 113 is turned OFF.

Figure 12:
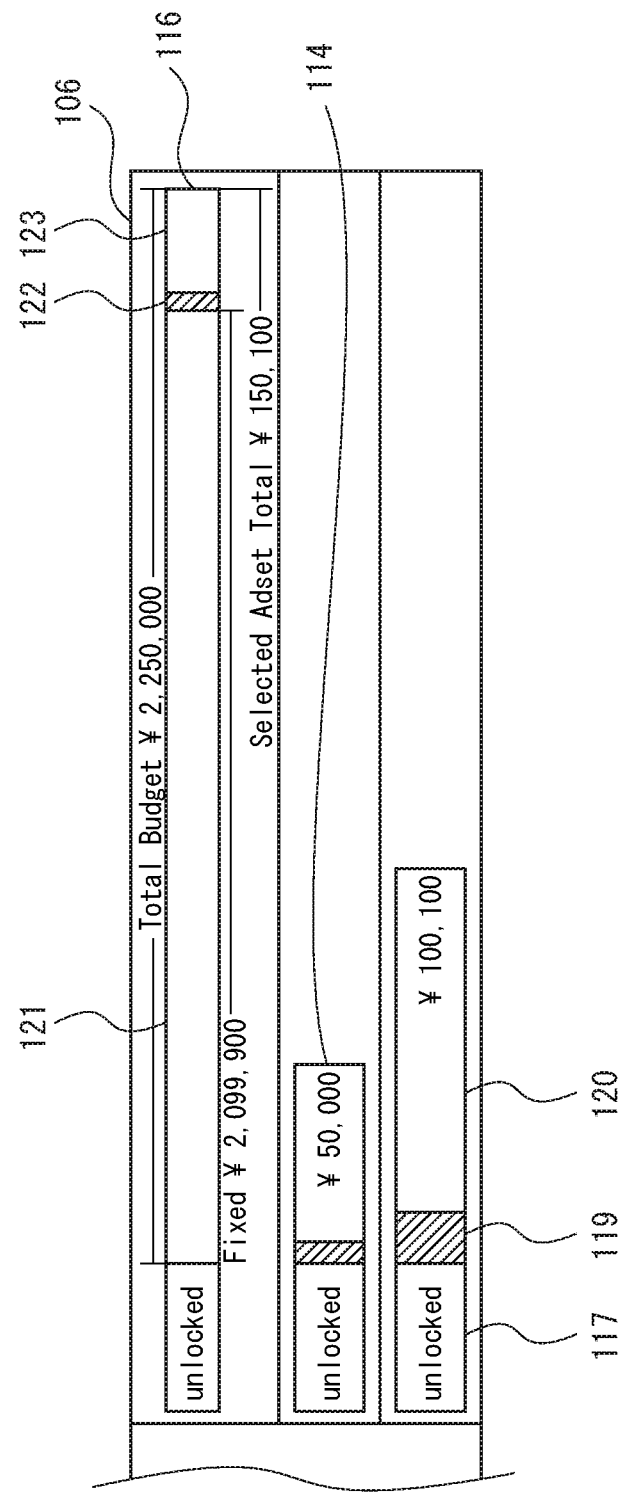
FIG. 12 It is a schematic diagram showing an example of a budget slide bar displayed on the budget adjustment screen as the advertisement set adjustment screen provided by the advertisement set management screen providing section of the advertisement management device in the advertisement management system in accordance with the embodiment of the present invention.

The budget slide bar 114 is adapted to visualize an amount of the budget of each target advertisement set by a length of a bar extended in the horizontal direction. In the budget slide bar 114, when the length of the bar is changed by slide operation, such as touch operation or cursor operation, the budget of each target advertisement set displayed in the advertisement set budget table 106 can be synchronously changed. For instance, as the budget slide bar 114 is lengthened, the budget is set higher, and as the budget slide bar 114 is shortened, the budget is set lower. As shown in FIG. 12, in the budget slide bar 114, a fixed display portion 119 indicating a minimum budget and an extensible portion 120 indicating an amount exceeding the minimum budget (budget−minimum budget) are displayed. The budget slide bar 114 cannot be shortened less than the fixed display portion 119. Moreover, the budget slide bar 114 of each target advertisement set cannot be lengthened so that the sum of the budget of the target advertisement set and the budget of other advertisement sets exceeds the advertisement set budget of the whole campaign. The fixed display portion 119 and the extensible portion 120 of the budget slide bar 114 are displayed by different paint-out colors. To the extensible portion 120 of the budget slide bar, the paint-out color is applied so that its shade is varied synchronously according to the length, and then, as the budget slide bar 114 is lengthened, the color is set darker, and as the budget slide bar 114 is shortened, the color is set lighter.

Moreover, above the budget slide bar 114 of each target advertisement set, a total budget slide bar 116 is arranged. An overall length of the total budget slide bar 116 indicates the amount of the advertisement set budget of the whole campaign (the budget displayed in the campaign total budget input box 103). On the total budget slide bar 116, a first fixed display portion 121 indicating an amount of the budgets of all other advertisement sets than the target advertisement sets contained in the campaign, a second fixed display portion 122 indicating the minimum budget of all target advertisement sets and an extensible portion 123 indicating an amount exceeding the sum of these. That is, on a portion except for the first fixed display portion 121 in the whole length of the total budget slide bar 116, an amount of the budget of all target advertisement sets is displayed. The total budget slide bar 116 cannot be shortened less than the first fixed display portion 121 and the second fixed display portion 122 and cannot be lengthened more than the advertisement set budget of the whole campaign. And then, the extensible portion 123 of the total budget slide bar 116 is lengthened and shortened synchronously in linkage with the budget slide bar 114 of each target advertisement set. That is, when the total budget slide bar 116 is lengthened or shortened, the advertisement set budget is synchronously increased or decreased. In accordance with increase or decrease of the advertisement set budget, the budget of each target advertisement set is synchronously increased or decreased and the budget slide bar 114 is synchronously lengthened or shortened. Moreover, the budget slide bar 114 of each target advertisement set is synchronously increased or decreased so that the total budget of each target advertisement set is stayed within the advertisement set budget. That is, when the budget slide bar 114 of one target advertisement set is lengthened or shortened, the budget of the target advertisement set is synchronously increased or decreased. In accordance with increase or decrease of the budget of this target advertisement set, the budgets of other target advertisement sets are synchronously decreased or increased and the budget slide bars 114 of other target advertisement sets are synchronously shortened or lengthened so that the total budget of each target advertisement set is stayed within the advertisement set budget.

In addition, the budget slide bar 114 and the total budget slide bar 116 include lock/unlock switching buttons 117, and then, when the lock/unlock switching button 117 is set to an unlock state, change of the budget is allowed, but, when the lock/unlock switching button 117 is set to a lock state, change of the budget is not allowed. Therefore, even if the total budget slide bar 116 is lengthened or shortened, the budget slide bar 114 of which the lock/unlock switching button 117 is set to the lock state is not lengthened or shortened, but other budget slide bar 114 in the unlock state is lengthened or shortened. Moreover, even if the budget slide bar 114 of one target advertisement set is lengthened or shortened, other budget slide bars 114 of which the lock/unlock switching button 117 are set to the lock state is not lengthened or shortened, but other budget slide bars 114 in the unlock state are lengthened or shortened.

The gender filter switching button 107 is a button for switching enable/disable of change of the budget according to the gender of the target of the target advertisement set. The log message input box 108 is arranged in order to write and record reason for decision of the budget and others, as a log.

On the budget adjustment screen 86, even if the budget displayed on the campaign total budget input box 103 or the budget of each target advertisement set displayed on the advertisement set budget table 106 is changed, the advertisement set budget table 106 is returned to the last condition (a condition before the last change) by operation of the return button 106 and is returned to the initial condition by operation of the reset button 110. The budget of each target advertisement set changed on the budget adjustment screen 86 is updated by an update button 118 arranged in the budget adjustment screen, and then, is set to the advertising server 3 by utilizing the API.

In the embodiment, as described above, the advertisement management system 1 comprises the advertising server 3 and the advertisement management device 4. The advertising server 3 allocates the advertising account to the advertiser of the internet advertisement (hereinafter, called as the advertisement simply) published by using the internet, as the SNS advertisement published while being attached to the social networking service (SNS). Moreover, the advertising server 3 is configured to be used for setting one or more campaigns for indicating the advertising objective with regard to the advertiser, to be used for setting one or more advertisement sets for indicating combination of the operation information of advertising with regard to each of the one or more campaigns, and to be used for setting one or more published advertisement with regard to each of the one or more advertisement sets. Further, the advertising server 3 is configured to collect a plurality of the performance information for indicating the performance of each advertisement set with regard to each of the one or more advertisement sets. The advertisement management device 4 is connected to the advertising server 3 to be used for reviewing and adjusting the campaign, the advertisement set and the published advertisement. Further, the advertisement management device 4 includes the campaign management screen providing section 18, the advertisement set management screen providing section 19 and the advertisement set adjustment screen providing section 20. The campaign management screen providing section 18 makes the management terminal 7 display the campaign management screen 32 used for selecting the target campaign among the one or more campaigns. The advertisement set management screen providing section 19 displays the one or more advertisement sets contained in the target campaign selected in the campaign management screen 32 by the parallel coordinate graph having the basis axis of the plurality of performance information, and makes the management terminal 7 display the advertisement set management screen 33 used for selecting one or more target advertisement sets among the one or more advertisement sets. The advertisement set adjustment screen providing section 20 makes the management terminal 7 display the advertisement set adjustment screen 34 used for adjusting the operation information contained in the one or more target advertisement sets selected in the advertisement set management screen 33.

In accordance with such a configuration, in the embodiment, the advertisement set management screen 33 for displaying much operation information and much performance information of many advertisement sets by the parallel coordinate graph is provided to the management terminal 7. Therefore, the advertiser and the manager can easily compare and review much operation information and much performance information of many advertisement sets. Thereby, a load of management work of the advertisement by the advertiser and the manager can be reduced and it is possible to prevent misreading of data or the like. Further, it is possible to immediately detect, among the operation information of the advertisement set, information requiring adjustment, and to bring the advertisement set adjustment screen 34 by selection operation of the advertisement set requiring adjustment of the operation information. Therefore, a procedure to adjustment of the operation information of the advertisement set can be simplified and the management work of the advertisement can be optimized.

In addition, according to the embodiment, in the advertisement management system 1, the advertisement set management screen providing section 19 is configured to be capable of directing a scope by slide operation along the basis axis on the parallel coordinate graph and to be capable of determining the narrowed-down scope on the basis of the directed scope. Moreover, the advertisement set management screen providing section 19 is configured, on the parallel coordinate graph, to display the advertisement set within the narrowed-down scope more remarkable than the advertisement set out of the narrowed-down scope and to allow selection of only the advertisement set within the narrowed-down scope as the target advertisement set.

In accordance with such a configuration, the advertiser and the manager can easily determine the narrowed-down scope by using the parallel coordinate graph and can easily detect the advertisement set requiring adjustment of the operation information. Therefore, since the advertisement set adjustment screen 34 with regard to the advertisement set requiring adjustment of the operation information is immediately brought to the advertiser and the manager, the management work of the advertisement can be optimized.

Further, according to the embodiment, in the advertisement management system 1, the advertising server 3 is used for setting the bidding price as the operation information. The advertisement set adjustment screen providing section 20 is configured to display the bidding price of each of the one or more target advertisement sets selected in the advertisement set management screen 33 by the bidding price slide bar 99 capable of slide-adjusting it. In addition, the advertisement set adjustment screen providing section 20 is configured to display the average bidding price of the one or more target advertisement sets by the average bidding price slide bar 101 capable of slide-adjusting it collectively.

Moreover, according to the embodiment, in the advertisement management system 1, the advertising server 3 is used for setting the budget as the operation information. The advertisement set adjustment screen providing section 20 is configured to display the budget of each of the one or more target advertisement sets selected in the advertisement set management screen 33 by the budget slide bar 114 capable of slide-adjusting it. In addition, the advertisement set adjustment screen providing section 20 is configured to display budgets of the one or more target advertisement sets by the total budget slide bar 116 capable of slide-adjusting their collectively.

In accordance with such configurations, the advertiser and the manager can easily correct the bidding price and the budget while comparing and reviewing the plurality of advertisement sets.

In addition, according to the embodiment, in the advertisement management system 1, the advertisement set adjustment screen providing section 20 displays the advertisement set adjustment screen 34 by pop-up from the advertisement set management screen 33.

In accordance with such a configuration, before or after adjustment of the operation information of the advertisement set, the advertisement set management screen 33 is not reloaded and the performance information of each advertisement set is not rewritten, and it is possible to prevent confusion of the advertiser and the manager.

Further, according to the embodiment, in the advertisement management system 1, the advertisement set adjustment screen providing section 20 is configured to display, on the advertisement set adjustment screen 34, the collective adjustment manner selection list 88 for listing a plurality of kinds of collective adjustment manners for collectively adjusting the respective bidding prices of the one or more target advertisement sets selected in the advertisement set management screen 33. In addition, the advertisement set adjustment screen providing section 20 is configured to be capable of collectively adjusting the one or more target advertisement sets on the basis of the collective adjustment manner selected in the collective adjustment manner selection list 88.

In accordance with such a configuration, it is possible to collectively adjust the bidding prices of the plurality of target advertisement sets by a desired collective adjustment manner, and then, to reduce time and labor of the advertiser and the manager.

Moreover, according to the embodiment, in the advertisement management system 1, the advertisement set adjustment screen providing section 20 displays, on the advertisement set adjustment screen 34, the lock/unlock switching buttons 102 used for locking individually the bidding price slide bars 101 corresponding to one or more target advertisement sets. In addition, the advertisement set adjustment screen providing section 20 is configured to be capable of adjusting only the bidding price slide bar 101 not locked by the lock/unlock switching button 102.

In accordance with such a configuration, even if many target advertisement sets are displayed on the advertisement set adjustment screen 34, it is possible to maintain setting of the bidding price by locking the bidding price slide bar 101 not requiring adjustment, and to allow adjustment of the bidding price of only other target advertisement set requiring adjustment.

Furthermore, according to the embodiment, in the advertisement management system 1, the advertisement set adjustment screen providing section 20 is configured to display, on the advertisement set adjustment screen 34, the collective adjustment manner selection list 104 for listing a plurality of kinds of collective adjustment manners for collectively adjusting the respective budgets of the one or more target advertisement sets selected in the advertisement set management screen 33. In addition, the advertisement set adjustment screen providing section 20 is configured to be capable of collectively adjusting the one or more target advertisement sets on the basis of the collective adjustment manner selected in the collective adjustment manner selection list 104.

In accordance with such a configuration, it is possible to collectively adjust the budgets of the plurality of target advertisement sets by a desired collective adjustment manner, for instance, to automatically distribute the budget according to the set bidding price or an actual cost, and then, to reduce time and labor of the advertiser and the manager.

Still further, according to the embodiment, in the advertisement management system 1, the advertisement set adjustment screen providing section 20 displays the total budget slide bar 116 adjustable within a range of the budget of the whole target campaign.

In accordance with such a configuration, it is possible to adjust increase or decrease of the whole budget of the advertisement set without necessity to input numerical values and to execute calculation, within the campaign budget range which can be visually and sensuously set, whole reviewing a total amount. Thereby, since the budget of the advertisement set is changed following movement of the slide without inputting and reviewing numerical values one by one, it is possible to rapidly carry out adjustment of simple increase or decrease of the budget.

Still furthermore, in the embodiment, in the advertisement management system 1, the advertisement set adjustment screen providing section 20 displays, on the advertisement set adjustment screen 34, the lock/unlock switching buttons 117 used for locking individually the budget slide bars 114 corresponding to one or more target advertisement sets and the total budget slide bar 116. In addition, the advertisement set adjustment screen providing section 20 is configured to be capable of adjusting only the budget slide bars 114 and the total budget slide bar 116 not locked by the lock/unlock switching button 117.

In accordance with such a configuration, even if many target advertisement sets are displayed on the advertisement set adjustment screen 34, it is possible to maintain setting of the budget by locking the budget slide bar 114 and the total budget slide bar 116 not requiring adjustment, and to allow adjustment of the budget of only other target advertisement set requiring adjustment.

As described above, in accordance with the advertisement management system 1 and the advertisement management device 4 of the present invention, it is possible to manage advertising independent of a web server, such as the SNS server 2, and an advertising server 3. Moreover, it is possible to reduce a load of management work of the internet advertisement and a load of adjustment of its operation information, and thereby, to improve use of the internet advertisement.

The embodiment was described about a configuration that, when "bidding price and budget" is selected by the management function executing button 81 in the advertisement set management screen providing section 19, the advertisement set adjustment screen providing section 20 displays the bidding price/budget adjustment screen 84 as the advertisement set adjustment screen 34. However, the adjustment screen of the operation information displayed on the advertisement set adjustment screen 34 is not restricted by this.

For instance, in another embodiment, the advertisement set adjustment screen providing section 20 may be configured to display a target correcting screen (not shown) as the advertisement set adjustment screen 34 when "target correction" is selected by the management function executing button 81 in the advertisement set management screen providing section 19. The target correcting screen (not shown) is the adjustment screen used for correcting the target to which the advertisement of each target advertisement set is published. The target correcting screen includes, for example, an input box, a drop-down list, a switching button, a search button and others in order to correct items, such as an advertisement set name, a custom audience, a location, age, gender, language, placement, connection, love interest, personal relationship, target factor, interest, educational background, special study, enrollment period, workplace and a managerial position.

Moreover, for instance, in a still other embodiment, the advertisement set adjustment screen providing section 20 may be configured to display a period adjustment screen (not shown) as the advertisement set adjustment screen 34 when "period" is selected by the management function executing button 81 in the advertisement set management screen providing section 19. The period adjustment screen (not shown) is the adjustment screen used for setting a period for publishing the advertisement of each target advertisement set. The period adjustment screen include, for instance, an input box or a calendar for collectively setting the start date and the end date, and includes an input box of a time zone or a heat map of one week for directing a time zone for publishing the advertisement of each target advertisement set.

Although the embodiment was described about a case where a configuration of the present invention was applied into the advertisement management system 1 and the advertisement management device 4 for hosting the social networking service (SNS), in a different embodiment, the configuration of the present invention may be applied into another system or another device capable of providing the internet advertisement on an online by using the internet.

Figure 13:
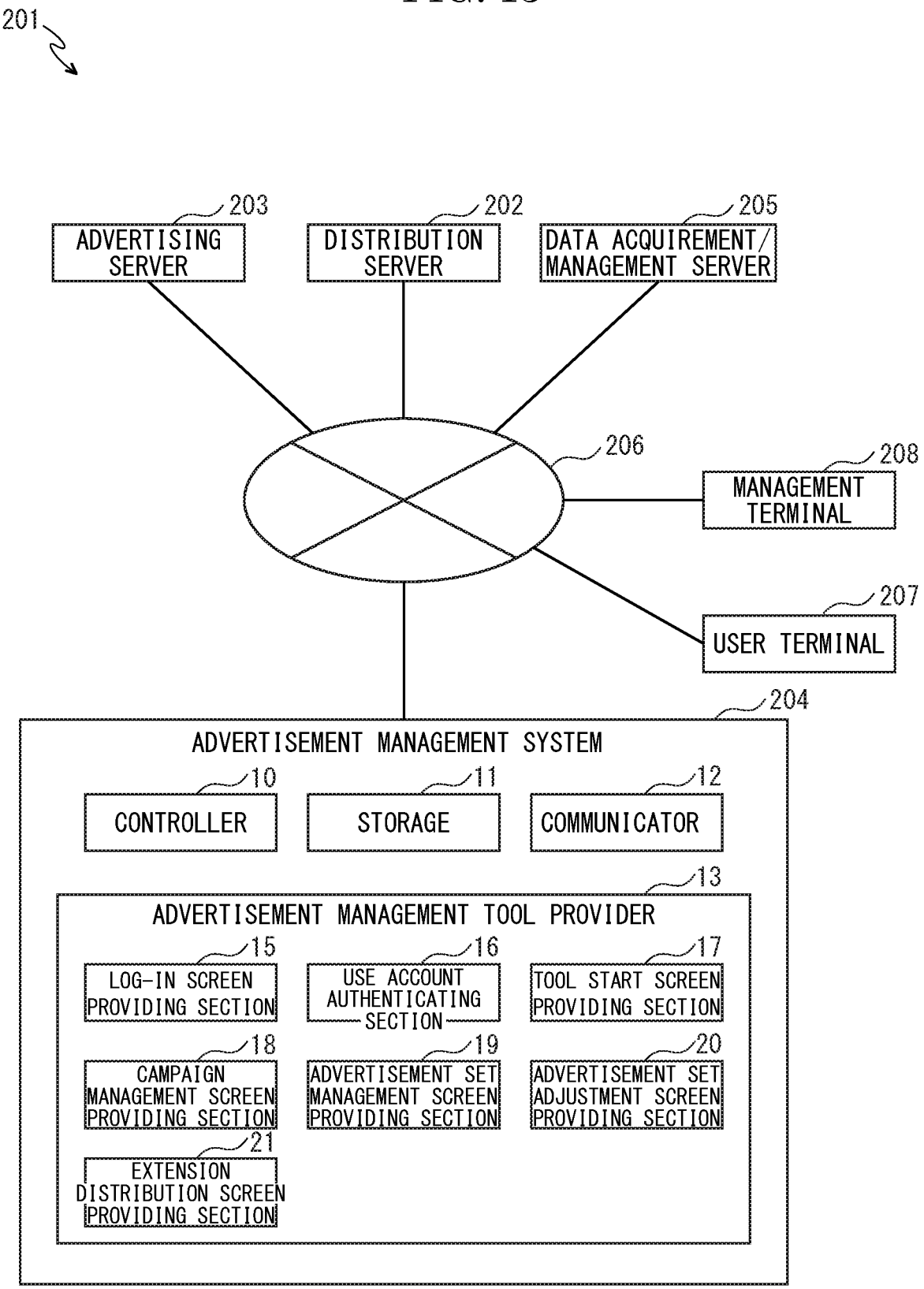
FIG. 13 It is a block diagram schematically showing an advertisement management system in accordance with another embodiment of the present invention.

For instance, as shown in FIG. 13, in an advertisement management system 201 of the different embodiment, a distribution server (a media server) 202 as the web server, an advertising server 203 similar to the above-described advertising server 3, an advertisement management device 204 similar to the above-described advertisement management device 4 and a data acquirement/management server 205 are arranged on a network 206, such as the internet. For example, the advertisement management system 201 is configured to actualize a real-time bidding (RTB) of the advertisement by utilizing SSP (Supply-Side Platform) in the distribution server 202 and utilizing DSP (Demand-Side Platform) in the advertising server 203.

The distribution server 202 may be a server for distributing the website having the advertisement frame used for displaying the advertisement distributed from the distributing and is not particularly limited. For example, the distribution server 202 may be the server for distributing the website, such as an enterprise site, a search engine site, an electronic commerce (EC) site and a content distribution site for a movie, music and others.

The data acquirement/management server 205 is a server for collecting and managing personal data of the user or the like utilized in various services hosted together with distribution of the website by the distribution server 202, for instance, is configured to utilize DMP (Data Management Platform). The personal data collected and managed in the data acquirement/management server 205 is utilized for distribution and management of advertising by the advertising server 203 and the advertisement management device 204 in addition to the distribution server 202. A business operator running the distribution server 202 and a business operator running the data acquirement/management server 205 may be the same business operator or relating business operators, or alternatively, different business operators.

Incidentally, in the advertisement management system 201, a plurality of distribution servers 202, a plurality of advertising servers 203 and a plurality of data acquirement/management servers 205 may be arranged, but FIG. 13 illustrates one distribution server 202, one advertising server 203 and one data acquirement/management server 205, for convenience of description. Moreover, one advertising server 203 may distribute the advertisement to the websites distributed by one or more distribution servers 202. Further, the advertisement management device 204 may manage a plurality of advertising services respectively hosted in the plurality of advertising servers 203.

In addition, in the advertisement management system 201, a user terminal 207 similar to the user terminal 6 and a management terminal 208 similar to the management terminal 7 are connected to the network 206. The user terminal 207 is a terminal for displaying the website distributed from the distribution server 202. The management terminal 208 is a terminal operated by an advertiser distributing the advertisement by utilizing the advertising server 203, a manager granted a permission of advertisement management by the advertiser, and others. The user terminal 207 may be a terminal of an account user having an account to the distribution server 202 or a terminal of a guest user not having the account.

In accordance with the advertisement management system 201 and the advertisement management device 204 of the different embodiment, since it is possible to manage the internet advertisement similar to the advertisement management system 1 and the advertisement management device 4 of the above-described embodiment, it is possible to achieve similar effects. Therefore, in the advertisement management system 201 and the advertisement management device 204 of the different embodiment, the present invention can manage advertising independent of the distribution server 202 and the advertising server 203. Moreover, it is possible to reduce a load of management work of the internet advertisement and a load of adjustment of its operation information, and to improve use of the internet advertisement.

The invention claimed is:

1. An advertisement management system comprising:

an advertising server allocating an advertising account to an advertiser of an advertisement published by using an internet, allowing to set one or more campaigns with regard to the advertiser and to set an advertising objective to each of the one or more campaigns, allowing to a plurality of advertisement sets with regard to each of the one or more campaigns and to set combination of operation information of advertising to each of the plurality of advertisement sets, allowing to set one or more published advertisements with regard to each of the plurality of advertisement sets, and collecting a plurality of performance information for indicating performance of each advertisement set with regard to each of the plurality of advertisement sets; and an advertisement management device connected to the advertising server, and allowing to review and adjust the campaign, the advertisement set and the published advertisement by a CPU of the advertisement management device, wherein the advertisement management device includes:

a campaign management screen providing section for making a terminal of the advertiser display a campaign management screen selectably displaying the one or more campaigns, and for deciding the campaign selected on the campaign management screen in response to operation of the campaign management screen as a target campaign;

an advertisement set management screen providing section for making the terminal of the advertiser display an advertisement set management screen selectably displaying the plurality of advertisement sets contained in the target campaign selected in the campaign management screen in response to operation of the campaign management screen to display a parallel coordinate graph having a plurality of vertical axes as basis axes arranged in a direction along a horizontal axis on the advertisement set management screen, wherein the plurality of vertical axes respectively representing the plurality of performance information, and to display line graphs respectively corresponding to the plurality of advertisement sets on the parallel coordinate graph by respectively plotting the plurality of performance information of each advertisement set on the plurality of vertical axes, and to display a list selectably listed the plurality of advertisement sets on the advertisement set management screen, and then, for deciding a narrowed-down scope of the plurality of advertisement sets to be displayed on the parallel coordinate graph in response to operation on the parallel coordinate graph to display the line graph of the advertisement set within the narrowed-down scope with a different color depth or a different line thickness from the advertisement set out of the narrowed-down scope, and for selectably listing only one or more advertisement sets within the narrowed-down scope among the plurality of advertisement sets contained in the target campaign in the list, and then, for deciding one or more advertisement sets selected in the list on the advertisement set management screen in response to operation of the advertisement set management screen as one or more target advertisement sets; and an advertisement set adjustment screen providing section for making the terminal of the advertiser display an advertisement set adjustment screen being adjustable the respective operation information contained in the one or more target advertisement sets selected in the advertisement set management screen in response to operation of the advertisement set management screen, and for collectively or individually adjusting the respective operation information of the one or more target advertisement sets in response to operation of the advertisement set adjustment screen.

2. The advertisement management system according to claim 1, wherein the advertisement set management screen providing section directs a scope in accordance with slide operation along the vertical axis on the parallel coordinate graph and determines the narrowed-down scope on the basis of the directed scope, and allows selection of only the advertisement set within the narrowed-down scope as the target advertisement set.

3. The advertisement management system according to claim 1, wherein the advertising server allows to set a bidding price as the operation information, the advertisement set adjustment screen providing section displays the bidding price of each of the one or more target advertisement sets selected in the advertisement set management screen by a bidding price slide bar capable of slide-adjusting it, and displays an average bidding price of the one or more target advertisement sets by an average bidding price slide bar capable of slide-adjusting it collectively.

4. The advertisement management system according to claim 3, wherein the advertisement set adjustment screen providing section displays, on the advertisement set adjustment screen, a collective adjustment manner selection list for listing a plurality of kinds of collective adjustment manners for collectively adjusting the respective bidding prices of the one or more target advertisement sets selected in the advertisement set management screen, and allows to collectively adjust the one or more target advertisement sets on the basis of the collective adjustment manner selected in the collective adjustment manner selection list.

5. The advertisement management system according to claim 1, wherein the advertising server allows to set a budget as the operation information, the advertisement set adjustment screen providing section displays the budget of each of the one or more target advertisement sets selected in the advertisement set management screen by a budget slide bar capable of slide-adjusting it, and displays budgets of the one or more target advertisement sets by a total budget slide bar capable of slide-adjusting their collectively.

6. The advertisement management system according to claim 5, wherein the advertisement set adjustment screen providing section displays, on the advertisement set adjustment screen, a collective adjustment manner selection list for listing a plurality of kinds of collective adjustment manners for collectively adjusting the respective budgets of the one or more target advertisement sets selected in the advertisement set management screen, and allows to collectively adjust the one or more target advertisement sets on the basis of the collective adjustment manner selected in the collective adjustment manner selection list.

7. The advertisement management system according to claim 5, wherein
the advertisement set adjustment screen providing section displays the total budget slide bar adjustable within a range of the budget of the whole target campaign.

8. An advertisement management device,
wherein the advertisement management device is connected to an advertising server allocating an advertising account to an advertiser of an advertisement published by using an internet, allowing to set one or more campaigns with regard to the advertiser and to set an advertising objective to each of the one or more campaigns, allowing to set a plurality of advertisement sets with regard to each of the one or more campaigns and to set combination of operation information of advertising to each of the plurality of advertisement sets, allowing to set one or more published advertisements with regard to each of the plurality of advertisement sets, and collecting a plurality of performance information for indicating performance of each advertisement set with regard to each of the plurality of advertisement sets, and the advertisement management device allows to review and adjust the campaign, the advertisement set and the published advertisement by a CPU,
the advertisement management device comprises:
a campaign management screen providing section for making a terminal of the advertiser display a campaign management screen selectably displaying the one or more campaigns, and for deciding the campaign selected on the campaign management screen in response to operation of the campaign management screen as a target campaign;
an advertisement set management screen providing section for making the terminal of the advertiser display an advertisement set management screen selectably displaying the plurality of advertisement sets contained in the target campaign selected in the campaign management screen in response to operation of the campaign management screen to display a parallel coordinate graph having a plurality of vertical axes as basis axes arranged in a direction along a horizontal axis on the advertisement set management screen, wherein the plurality of vertical axes respectively representing the plurality of performance information, and to display line graphs respectively corresponding to the plurality of advertisement sets on the parallel coordinate graph by respectively plotting the plurality of performance information of each advertisement set on the plurality of vertical axes, and to display a list selectably listed the plurality of advertisement sets on the advertisement set management screen, and then, for deciding a narrowed-down scope of the plurality of advertisement sets to be displayed on the parallel coordinate graph in response to operation on the parallel coordinate graph to display the line graph of the advertisement set within the narrowed-down scope with a different color depth or a different line thickness from the advertisement set out of the narrowed-down scope, and for selectably listing only one or more advertisement sets within the narrowed-down scope among the plurality of advertisement sets contained in the target campaign in the list, and then, for deciding one or more advertisement sets selected in the list on the advertisement set management screen in response to operation of the advertisement set management screen as one or more target advertisement sets; and
an advertisement set adjustment screen providing section for making the terminal of the advertiser display an advertisement set adjustment screen being adjustable the respective operation information contained in the one or more target advertisement sets selected in the advertisement set management screen in response to operation of the advertisement set management screen, and for collectively or individually adjusting the respective operation information of the one or more target advertisement sets in response to operation of the advertisement set adjustment screen.

9. The advertisement management device according to claim 8, wherein
the advertisement set management screen providing section directs a scope in accordance with slide operation along the vertical axis on the parallel coordinate graph and determines the narrowed-down scope on the basis of the directed scope, and allows selection of only the advertisement set within the narrowed-down scope as the target advertisement set.

10. The advertisement management device according to claim 8, wherein
the advertising server allows to set a bidding price as the operation information,
the advertisement set adjustment screen providing section displays the bidding price of each of the one or more target advertisement sets selected in the advertisement set management screen by a bidding price slide bar capable of slide-adjusting it, and displays an average bidding price of the one or more target advertisement sets by an average bidding price slide bar capable of slide-adjusting it collectively.

11. The advertisement management device according to claim 10, wherein
the advertisement set adjustment screen providing section displays, on the advertisement set adjustment screen, a collective adjustment manner selection list for listing a plurality of kinds of collective adjustment manners for collectively adjusting the bidding price of each of the one or more target advertisement sets selected in the advertisement set management screen, and allows to collectively adjust the one or more target advertisement sets on the basis of the collective adjustment manner selected in the collective adjustment manner selection list.

12. The advertisement management device according to claim 8, wherein
the advertising server allows to set a budget as the operation information,
the advertisement set adjustment screen providing section displays the budget of each of the one or more target advertisement sets selected in the advertisement set management screen by a budget slide bar capable of slide-adjusting it, and displays budgets of the one or more target advertisement sets by a total budget slide bar capable of slide-adjusting their collectively.

13. The advertisement management device according to claim 12, wherein
the advertisement set adjustment screen providing section displays, on the advertisement set adjustment screen, a collective adjustment manner selection list for listing a plurality of kinds of collective adjustment manners for collectively adjusting the budget of each of the one or more target advertisement sets selected in the advertisement set management screen, and allows to collectively adjust the one or more target advertisement sets on the basis of the collective adjustment manner selected in the collective adjustment manner selection list.

14. The advertisement management device according to claim 12, wherein the advertisement set adjustment screen providing section displays the total budget slide bar adjustable within a range of a budget of the whole campaign.

* * * * *